(12) United States Patent
Taylor et al.

(10) Patent No.: US 10,769,644 B2
(45) Date of Patent: Sep. 8, 2020

(54) CROSS-DOMAIN IDENTITY SERVICE

(71) Applicant: Adobe Inc., San Jose, CA (US)

(72) Inventors: Ian Taylor, Portland, OR (US); Eric Kienle, Portland, OR (US); Shaun Klopfenstein, Portland, OR (US)

(73) Assignee: ADOBE INC., San Jose, CA (US)

( * ) Notice: Subject to any disclaimer, the term of this patent is extended or adjusted under 35 U.S.C. 154(b) by 182 days.

(21) Appl. No.: 14/219,791

(22) Filed: Mar. 19, 2014

(65) Prior Publication Data

US 2015/0262199 A1 Sep. 17, 2015

Related U.S. Application Data

(60) Provisional application No. 61/951,473, filed on Mar. 11, 2014.

(51) Int. Cl.
*G06Q 30/02* (2012.01)
*G06F 16/954* (2019.01)
*G06F 16/9535* (2019.01)
*H04L 29/08* (2006.01)

(52) U.S. Cl.
CPC ....... *G06Q 30/0201* (2013.01); *G06F 16/954* (2019.01); *G06F 16/9535* (2019.01); *H04L 67/02* (2013.01); *H04L 67/22* (2013.01); *H04L 67/303* (2013.01)

(58) Field of Classification Search
CPC ........ G06C 30/02; H04L 67/22; G06Q 30/02; G06Q 30/0201; G06F 16/9535
USPC ........................................................ 709/203
See application file for complete search history.

(56) References Cited

U.S. PATENT DOCUMENTS

| | | | |
|---|---|---|---|
| 6,839,680 B1 * | 1/2005 | Liu | G06Q 30/0204 705/7.33 |
| 7,979,791 B2 | 7/2011 | Yang et al. | |
| 8,386,561 B2 | 2/2013 | Artz, Jr. et al. | |
| 8,438,184 B1 * | 5/2013 | Wang | H04L 67/02 707/780 |
| 8,990,298 B1 * | 3/2015 | Anderson | H04L 67/20 709/203 |
| 9,912,767 B1 * | 3/2018 | Weald | H04L 67/42 |

(Continued)

FOREIGN PATENT DOCUMENTS

WO WO 2015/138570 9/2015

OTHER PUBLICATIONS

"Web Page", TechTerms <https://techterms.com/definition/webpage>. (Year: 2012).*

(Continued)

*Primary Examiner* — Tonia L Dollinger
*Assistant Examiner* — Jonathan A Sparks
(74) *Attorney, Agent, or Firm* — Keller Jolley Preece

(57) ABSTRACT

A method is provided, including the following method operations: accessing a first web page associated with a first domain using a browser of a device; in response to the accessing the first web page, accessing an identity server to retrieve an identifier for the browser that accessed the first web page, the identifier being stored to a local storage of the device; accessing a second web page associated with a second domain using the browser; in response to the accessing the second page, accessing the local storage of the device to retrieve the identifier; wherein accessing the first web page and accessing the second web page are associated to the identifier.

20 Claims, 19 Drawing Sheets

(56) References Cited

U.S. PATENT DOCUMENTS

| | | | |
|---|---|---|---|
| 2002/0063735 A1* | 5/2002 | Tamir | G06F 11/3438 |
| | | | 715/745 |
| 2002/0107842 A1* | 8/2002 | Biebesheimer | G06F 16/951 |
| 2006/0041549 A1* | 2/2006 | Gundersen | G06F 16/951 |
| 2006/0248452 A1* | 11/2006 | Lambert | G06Q 30/02 |
| | | | 715/205 |
| 2006/0265495 A1* | 11/2006 | Butler | G06F 17/30899 |
| | | | 709/224 |
| 2009/0083269 A1 | 3/2009 | Artz, Jr. et al. | |
| 2009/0327421 A1 | 12/2009 | Fu et al. | |
| 2011/0231240 A1 | 9/2011 | Schoen et al. | |
| 2012/0101907 A1* | 4/2012 | Dodda | G06Q 30/0277 |
| | | | 705/14.73 |
| 2012/0110469 A1 | 5/2012 | Magarshak | |
| 2012/0304286 A1* | 11/2012 | Croll | G06F 21/6263 |
| | | | 726/22 |
| 2012/0311684 A1* | 12/2012 | Paulsen | H04L 63/0815 |
| | | | 726/6 |
| 2012/0317620 A1 | 12/2012 | Fefelov et al. | |
| 2013/0124309 A1* | 5/2013 | Traasdahl | H04L 67/22 |
| | | | 705/14.49 |
| 2013/0311286 A1* | 11/2013 | Detwiler | G06Q 30/0255 |
| | | | 705/14.54 |
| 2014/0279045 A1* | 9/2014 | Shottan | G06Q 30/0269 |
| | | | 705/14.66 |
| 2015/0032509 A1* | 1/2015 | Fuentes | G06Q 30/0203 |
| | | | 705/7.32 |

OTHER PUBLICATIONS

PCT International Search Report and Written Opinion in Application No. PCT/US2015/019898, dated Jun. 18, 2015, 12 total pages.

* cited by examiner

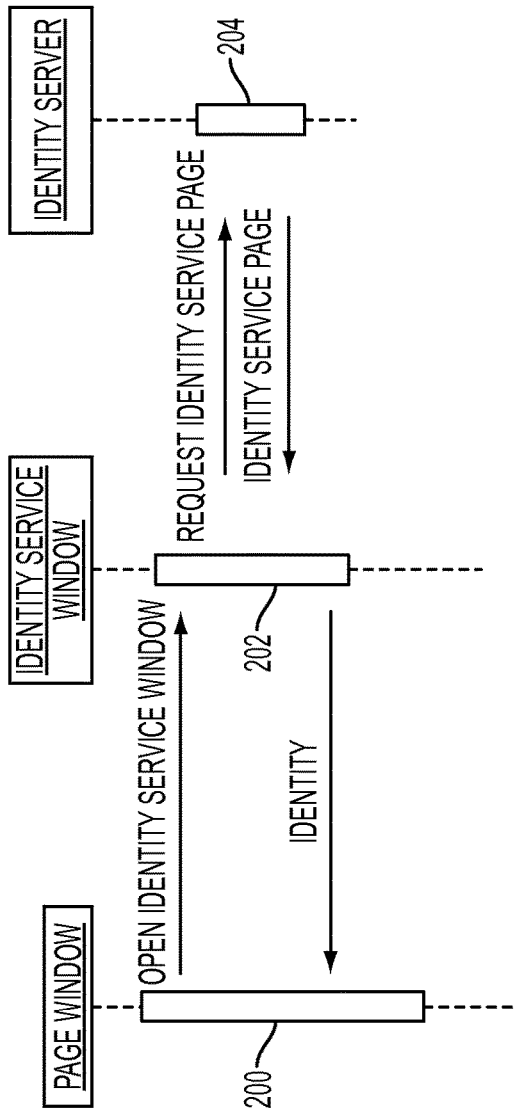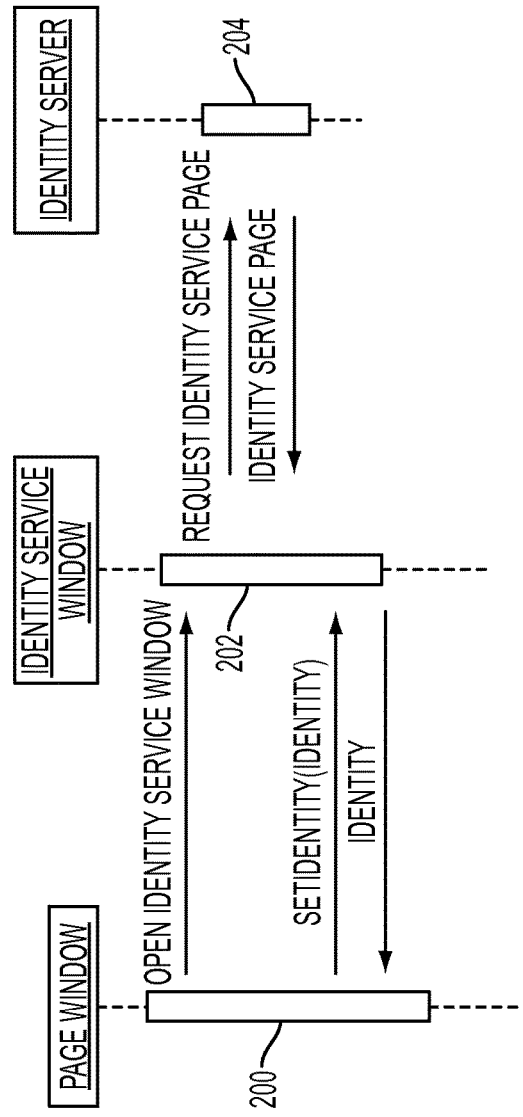

CROSS-DOMAIN IDENTITY SERVICE

CLAIM OF PRIORITY

This application claims priority to U.S. Provisional Application No. 61/951,473, filed Mar. 11, 2014, entitled "Cross-Domain Identity Service," which is hereby incorporated by reference in its entirety.

RELATED APPLICATIONS

This application is related to U.S. application Ser. No. 13/426,389, filed Mar. 21, 2012, entitled "PROVIDING MARKETING ANALYTICS RELATED TO A SALES OPPORTUNITY OVER A TIMELINE IN A MARKETING MANAGEMENT SYSTEM," which is hereby incorporated by reference in its entirety.

FIELD

The present disclosure relates to systems and methods for identifying and/or tracking the identity of a web visitor across multiple domains.

BACKGROUND

In recent years, the growth of the Internet has given rise to numerous online opportunities whereby marketers may market their goods or services. Examples of web-based properties which may be utilized for such purposes include social media sites, landing pages (which a visitor may arrive at through some other mechanism, such as an advertisement or an e-mail), corporate web sites, mobile sites, shopping carts, etc. These properties typically exist on different websites or domains. However, because some modern browser technologies do not allow cookies to be directly used across domains, there are limits on the ability to identify users across multiple domains.

For example, it is not uncommon for a given company's corporate web site to be hosted at a domain that is different from that of the company's e-commerce site. Or in another scenario, a company may market goods on multiple sites, each of which having a different domain. In the absence of some identifying information provided by the user, it can be difficult or not possible to track the user across these different domains. However, without such an ability, it is difficult to understand the effect that interactions occurring on one site may have on another. This information is especially useful to entities that market or assist others to market goods and services to individuals online.

It is in this context that embodiments of the invention arise.

SUMMARY

Embodiments described in the present disclosure provide systems, apparatus, computer readable media, and methods for identifying and/or tracking the identity of a web visitor across multiple domains.

In one embodiment, a method is provided, including the following method operations: accessing a first web page associated with a first domain using a browser of a device; in response to the accessing the first web page, accessing an identity server to retrieve an identifier for the browser that accessed the first web page, the identifier being stored to a local storage of the device; accessing a second web page associated with a second domain using the browser; in response to the accessing the second page, accessing the local storage of the device to retrieve the identifier; wherein accessing the first web page and accessing the second web page are associated to the identifier.

In one embodiment, accessing the first web page defines user interactions at the first domain; wherein accessing the second web page defines user interactions at the second domain; and wherein the identifier is utilized to correlate the user interactions at the first domain and the user interactions at the second domain as originating from the browser of the device.

In one embodiment, the method further includes: in response to retrieving the identifier from the identity server, sending the identifier and data identifying the user interactions at the first domain to a marketing server; in response to retrieving the identifier from the local storage, sending the identifier and data identifying the user interactions at the second domain to the marketing server, the marketing server being configured to perform the correlating of the user interactions at the first domain and the user interactions at the second domain.

In one embodiment, accessing the identity server is defined from a sub-context of the first web page; and wherein accessing the local storage is defined from a sub-context of the second web page.

In one embodiment, the identity server defines a third domain, the local storage of the device being designated for the third domain.

In another embodiment, a method for identifying a visitor to a page is provided, including the following method operations: rendering a first web page having an address defined by a first domain; from the first web page, retrieving a second web page having an address defined by a second domain, wherein retrieving the second web page includes, accessing a local storage associated with the second domain to determine whether an identifier is stored to the local storage, and if the identifier is stored to the local storage, then retrieving the identifier from the local storage, and if the identifier is not stored to the local storage, then retrieving the identifier from a remote server and storing the identifier to the local storage; receiving the retrieved identifier at the first web page.

In one embodiment, retrieving the second web page is defined from a non-visible frame of the rendered first web page.

In one embodiment, retrieving the second web page is from a cache associated with a browser in which the first web page is rendered.

In one embodiment, the method further includes: from the first web page, retrieving personalized data based on the identifier.

In one embodiment, rendering the first web page is defined from a social network page.

In another embodiment, a method for identifying a visitor to a page is provided, including the following method operations: receiving a request from a browser, the browser rendering a first web page having an address defined by a first domain, the request being generated in response to rendering of the first web page; in response to the request, transmitting a second web page to the browser for execution, the second web page having an address defined by a second domain, wherein execution of the second web page by the browser is configured to, access a local storage associated with the second domain to determine whether an identifier is stored to the local storage, and if the identifier is stored to the local storage, then retrieve the identifier from the local storage, and if the identifier is not stored to the local storage, then retrieve the identifier from a remote server and store the identifier to the local storage, and transfer the retrieved identifier to the first web page.

In one embodiment, execution of the second web page is defined in a non-visible frame of the rendered first web page.

In one embodiment, the first web page is configured to retrieve personalized data based on the retrieved identifier.

In one embodiment, rendering the first web page is defined from a social network page.

In another embodiment, a method for identifying a visitor to a page is provided, including the following method operations: during rendering of a web page from a first domain by a browser executing on a client device, receiving from the browser an identifier, the identifier being retrieved by the browser in response to the rendering of the web page from the first domain, the identifier being retrieved from a local storage associated with a second domain; storing in association with the identifier, data identifying the rendering of the web page from the first domain.

In one embodiment, rendering the web page includes loading an identity service page, the identity service page being configured to retrieve the identifier from the local storage associated with the second domain.

In one embodiment, loading the identity service page is in a hidden frame of the rendered web page from the first domain.

In one embodiment, loading the identity service page is from a cache associated with the browser.

In one embodiment, the method further includes: retrieving personalized content based on the identifier; and transmitting the personalized content to the browser for rendering as part of the web page.

In one embodiment, the method further includes: during rendering of a web page from a third domain by the browser executing on the client device, receiving from the browser the identifier, the identifier being retrieved by the browser in response to the rendering of the web page from the third domain, the identifier being retrieved from the local storage associated with the second domain; storing in association with the identifier, data identifying the rendering of the web page from the third domain.

Other aspects will become apparent from the following detailed description, taken in conjunction with the accompanying drawings, illustrating by way of example the principles of embodiments described in the present disclosure.

BRIEF DESCRIPTION OF THE DRAWINGS

Various embodiments described in the present disclosure may best be understood by reference to the following description taken in conjunction with the accompanying drawings.

FIG. 2A is a logical diagram conceptually illustrating communications flow between various logical components for purposes of identifying a visitor to a web page, in accordance with an embodiment of the invention.

FIG. 2B is a logical diagram illustrating an extension of the embodiment of FIG. 2A, describing a scenario wherein the identity of the visitor is already known, in accordance with an embodiment of the invention.

FIG. 11A illustrates an interface for viewing web activity reports, in accordance with an embodiment of the invention.

FIG. 11B illustrates an interface similar to that of FIG. 11A, but configured to display a web activity report for a specific identified user, in accordance with an embodiment of the invention.

DETAILED DESCRIPTION

Figure 1:
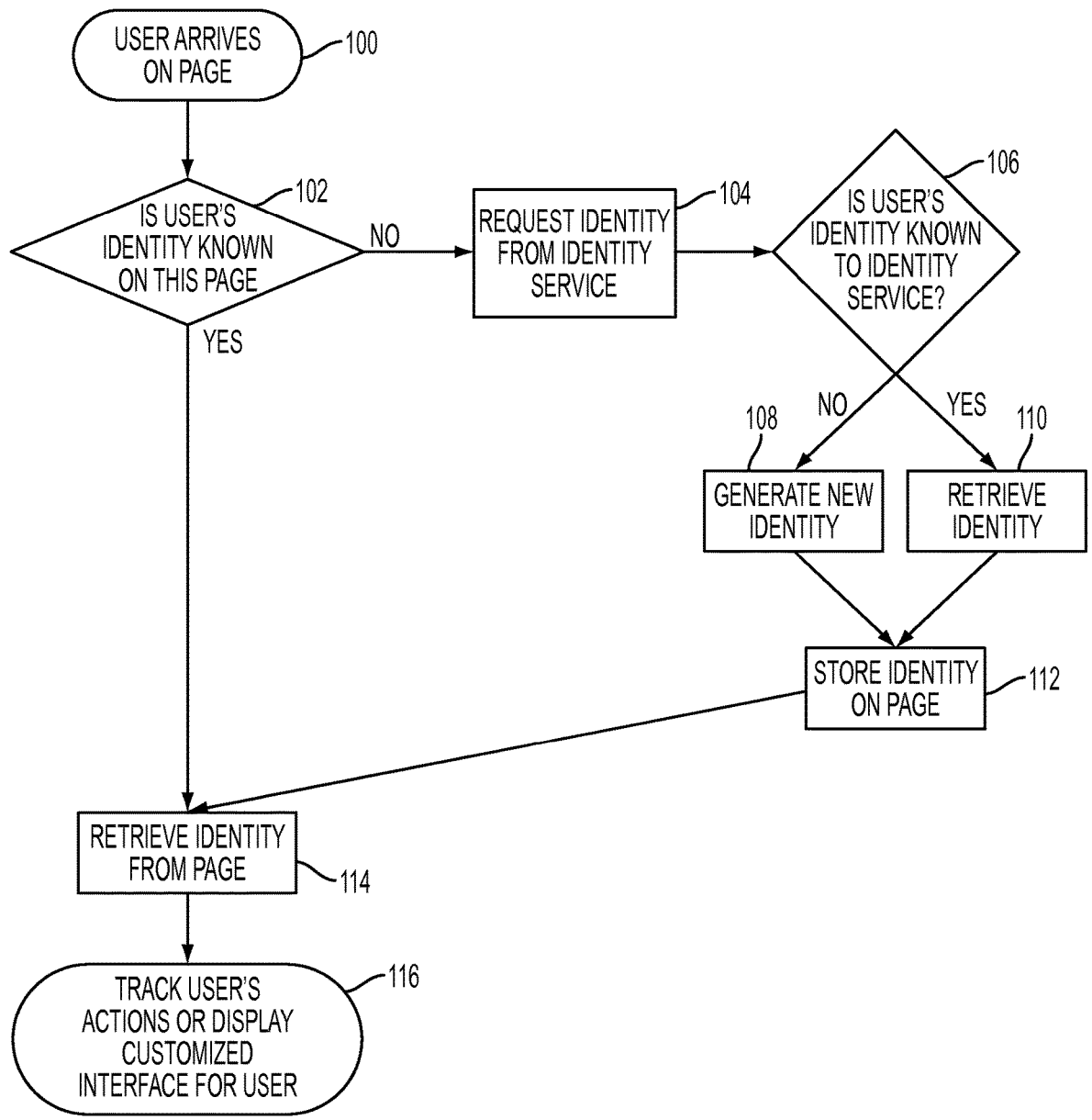
FIG. 1 illustrates a method for identifying a user that arrives at a web page, in accordance with an embodiment of the invention.

Embodiments described in the present disclosure provide systems, apparatus, computer readable media, and methods for identifying and/or tracking the identity of a web visitor across multiple domains.

In some embodiments, the methods and systems provide identity logic (e.g., code) for associating an identity to visitors of select domains (e.g., sites), based on the device and/or browser utilized by the visitors. In one embodiment, the identity logic may be incorporated into the select domains, e.g., such as domains for which an entity may wish to track user behavior and/or activities. Thus, visitors to the particular domains having the identity logic can be identified to be the same visitor, and more uniform tracking of user actions can take place.

Therefore, by providing the identity logic at certain domains (e.g., sites), any visit by the same visitor at any of the domains can be identified as defined from their device/browser. In one embodiment, once a visitor is identified with an identity, that visitor's identity can be augmented with more identifying information over time. The augmenting can occur, for example, if the visitor provides information to the domains, such as by filling out a form, providing a name, providing an email, providing an address, providing a telephone number, etc. In other embodiments, the augmenting can occur automatically, such as by code that queries other sites on the web, e.g., social networks, business social networking sites, directories, company websites, etc. In still other embodiments, visitors that are uniquely identified based on their access to domains using one device/browser, may also be uniquely identified based on their use of another device or browser. Synchronizing of two or more unique identities may occur, as more information about the visitor is determined during the actions performed at the domains. For instance, a unique person may be using two or more devices/browsers, which is assigned an identity (for each device/browser) for the cross-domain activities/visits. At some point the user, via each of the devices/browsers, may provide enough information such that the various identities are associated as belonging to one person.

It should be noted that there are many inventions described and illustrated herein. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, many of those permutations and combinations will not be discussed separately herein.

Further, in the course of describing and illustrating the present inventions, various circuitry, architectures, structures, components, functions and/or elements, as well as combinations and/or permutations thereof, are set forth. It should be understood that circuitry, architectures, structures, components, functions and/or elements other than those specifically described and illustrated, are contemplated and are within the scope of the present inventions, as well as combinations and/or permutations thereof.

Broadly speaking, embodiments of the invention allow for the tracking of visitors across multiple domains. In accordance with embodiments of the invention described in further detail herein, a deployable code module can be embedded in web pages hosted by different domains. The code module is configured to identify the visitor by reference to an identity page associated with a third-party domain. The third-party domain exists independent of the domains of the web pages which the user is visiting, and is therefore referenced across domains by the same deployable code module. The identity page can be configured to communicate with an identity server to retrieve a unique identifier (ID) to be associated with the visitor's browser. The ID is passed back to the web page that instantiated the identity page, for use in identifying the visitor to the web page. The ID can be stored in a local storage of the visitor's browser that is designated for the third-party domain. In this manner, during subsequent visits to web pages which include the deployable code module, the identity page can be configured to first check the local storage associated with the third-party domain to determine if an ID has already been stored for the visitor.

Embodiments in accordance with the present invention may be especially useful for marketers seeking to understand the relationship between activity by a visitor occurring on one domain and activity by the user occurring on a separate domain. For example, it may be the case that the user acquired information on one domain that ultimately led to a sale on another domain. The technology described herein can be useful for enabling such relationships to be deduced through tracking of the user's activity across different domains.

A service is herein described which stores visitor identity information on a common domain for all website visitors. The identity information is made available for retrieval on pages running in any domain. This identity information allows tracking and identification of one visitor across multiple domains. This can allow a marketer to identify visitors across multiple sites and campaigns.

FIG. 1 illustrates a method for identifying a user that arrives at a web page, in accordance with an embodiment of the invention. At method operation 100, the user navigates to a web page. At method operation 102, it is determined whether the user's identity is known on the web page. If the user's identity is known, then at method operation 114, the user's identity is retrieved. At method operation 116, the user's identity is utilized for purposes of tracking the user's actions or to display customized content or a customized interface to the user.

Returning to method operation 102, if the user's identity is not known on the web page, then at method operation 104, a request is made to an identity service for the identity of the user. At method operation 106, it is determined whether the user's identity is known to the identity service. If yes, then at method operation 110, the identity is retrieved. If no, then at method operation 108, a new identity for the user is generated. At method operation 112, the identity of the user (whether retrieved or newly generated) is stored on the page. At method operation 114, the user's identity is retrieved from the page. And at method operation 116, the user's identity is utilized for tracking the user's activity or for customization.

As discussed in further detail below, the request for the identity of the user from the identity service discussed with reference to method operation 104 can be defined by an identity page that is instantiated within a non-visible frame of the web page. The identity page can be configured to determine whether the user's identity is stored to a local storage associated with an identity domain, and retrieve the user's identity from the local storage if it is available. If the user's identity is not available, then the identity page can be configured to request the identity of the user from an identity server, which in turn can be configured to generate a new ID for the user.

FIG. 2A is a logical diagram conceptually illustrating communications flow between various logical components for purposes of identifying a visitor to a web page, in accordance with an embodiment of the invention. It is generally contemplated that the principles illustrated by the present embodiment can apply to browsers capable of rendering HTML5. However, it will be appreciated that such principles may be extended or adapted for use with browsers that do not render HTML5.

In the illustrated embodiment, a page window is represented at reference 200; an identity service window is represented at reference 202; and an identity server is represented at reference 204. The visitor first opens the web page in the page window, which is defined by a browser application through which the visitor accesses the web page. From the page window, the identity service window is opened within the context of the page window. That is, the identity service window is defined within a frame or sub-window within the page window. The identity service window can be a hidden window that is not visible to the visitor.

From the identity service window, a request is made to the identity server for an identity service page. In response to the request, the identity server serves the identity service page to the identity service window. The identity service page is executed in the identity service window, and outputs an ID for the visitor. The ID of the visitor can be a preexisting ID, or may be generated anew at the time of the request. For example, the identity service page can be configured to check if a local storage designated for the domain of the identity service page contains the ID for the visitor. If yes, then the ID is retrieved from the local storage; if no, then the identity service page may be configured to request an ID from the identity server, which in response to the request may generate a new ID and return it to the identity service page.

Thus, the ID for the visitor is obtained in the context of the identity service window, from which the ID is returned to the page window. Within the page window, the ID is utilized to facilitate tracking of the activity of the visitor (e.g. actions of the visitor are recorded and stored in association with the ID), or the ID can be utilized to provide personalized content to the user.

FIG. 2B is a logical diagram illustrating an extension of the embodiment of FIG. 2A, describing a scenario wherein the identity of the visitor is already known, in accordance with an embodiment of the invention. By way of example, when the visitor clicks on a link embedded in an e-mail received at an account of the visitor, then the identity of the visitor is already known in the sense that the visitor has already provided at least an e-mail address which identifies the visitor. In such a situation, the referral link to the web page that is opened in the page window can provide the ID of the visitor to the page window (e.g. included in the referral URL).

When the web page is opened in the page window, the identity service window is opened, and the identity service page is loaded in the identity service window as previously discussed. However, the identity service page can be configured to receive the ID from the page window, and then pass the ID back to the page window. This setup allows the web page to function in the same manner as previously described with reference to FIG. 2A, including the opening of the identity service window and request for the identity service page, but flexibly allows the ID to be set from another source, without significantly altering the overall identification procedure that is carried out for the web page.

Embodiments of the invention described in the present specification are drawn to an HTML5 browser application that permits a new frame to be opened within the context of a page window, with an identity service page being loaded in the new frame, such that the identity service page has a different domain from that of the parent web page loaded in the page window. It is contemplated that the HTML5 localStorage API is utilized to facilitate both storage of the visitor's ID (in association with the domain of the identity service page) and subsequent retrieval of the visitor's ID. Furthermore, it is contemplated that the HTML5 postMessage API can be utilized to send the visitor's ID back to the parent web page from which the identity service page was called. Though embodiments of the present disclosure may utilize the aforementioned API's as currently defined by the HTML5 specification, it will be appreciated by those skilled in the art that the principles exemplified by such embodiments may be applied in other contexts or in conjunction with other API's. Thus, aspects of the present disclosure which are drawn to HTML5-specific operations are to be broadly construed as exemplary embodiments which are provided by way of example without limitation.

Figure 3:
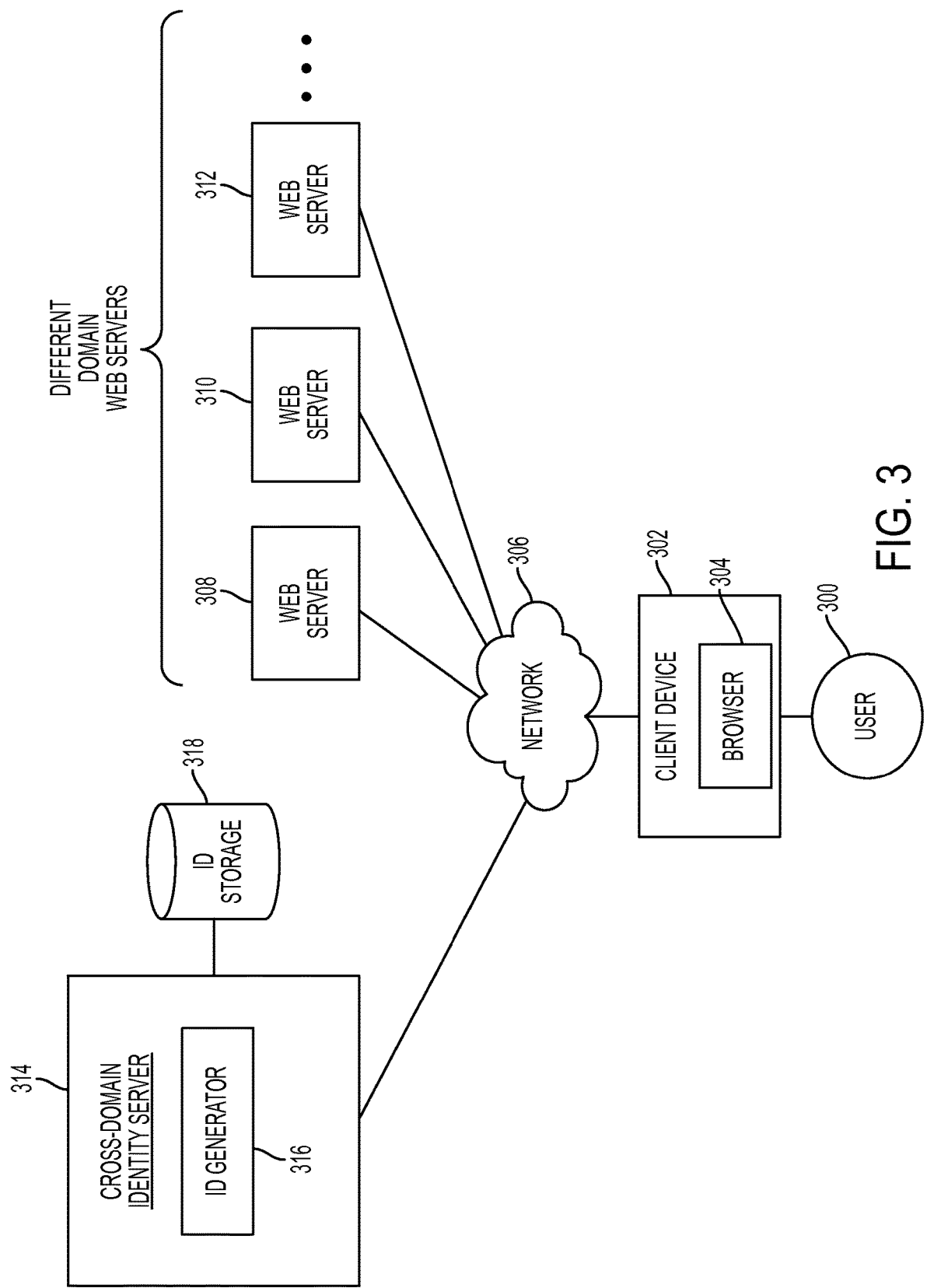
FIG. 3 illustrates a system for tracking the identity of a web visitor across multiple domains, in accordance with an embodiment of the invention.

FIG. 3 illustrates a system for tracking the identity of a web visitor across multiple domains, in accordance with an embodiment of the invention. A user 300 operates a client device 302. The client device 302 can be any type of computing device capable of executing a browser application 304 and communicating over a network 306. By way of example, client device 302 may be a personal computer, laptop, tablet, smartphone, mobile device, or any other type of computing device. Additionally, it will be appreciated that the network 306 may include any of various types of wired or wireless networks facilitating communication of data between the components of the illustrated system, including without limitation, LAN, WAN, WiFi, cellular, cable, satellite, and other types of networks.

The browser 304 communicates over network 306 to retrieve web pages from various web servers 308, 310, and 312, each of which may have a different domain. To facilitate tracking of the activity of the user 300 across the various domains, an identity server 314 is provided. The identity server 314 defines a common domain for purposes of identification across the various domains defined by the web servers 308, 310, and 312. The user's ID can be stored in association with the common domain, and therefore the same ID can be easily retrieved and utilized across the various other domains defined by the web servers. The identity server 314 includes an ID generator 316 that is configured to generate new ID's. The identity server 314 is connected to an ID storage 318 that stores ID's which have been assigned to various users.

Figure 4A:
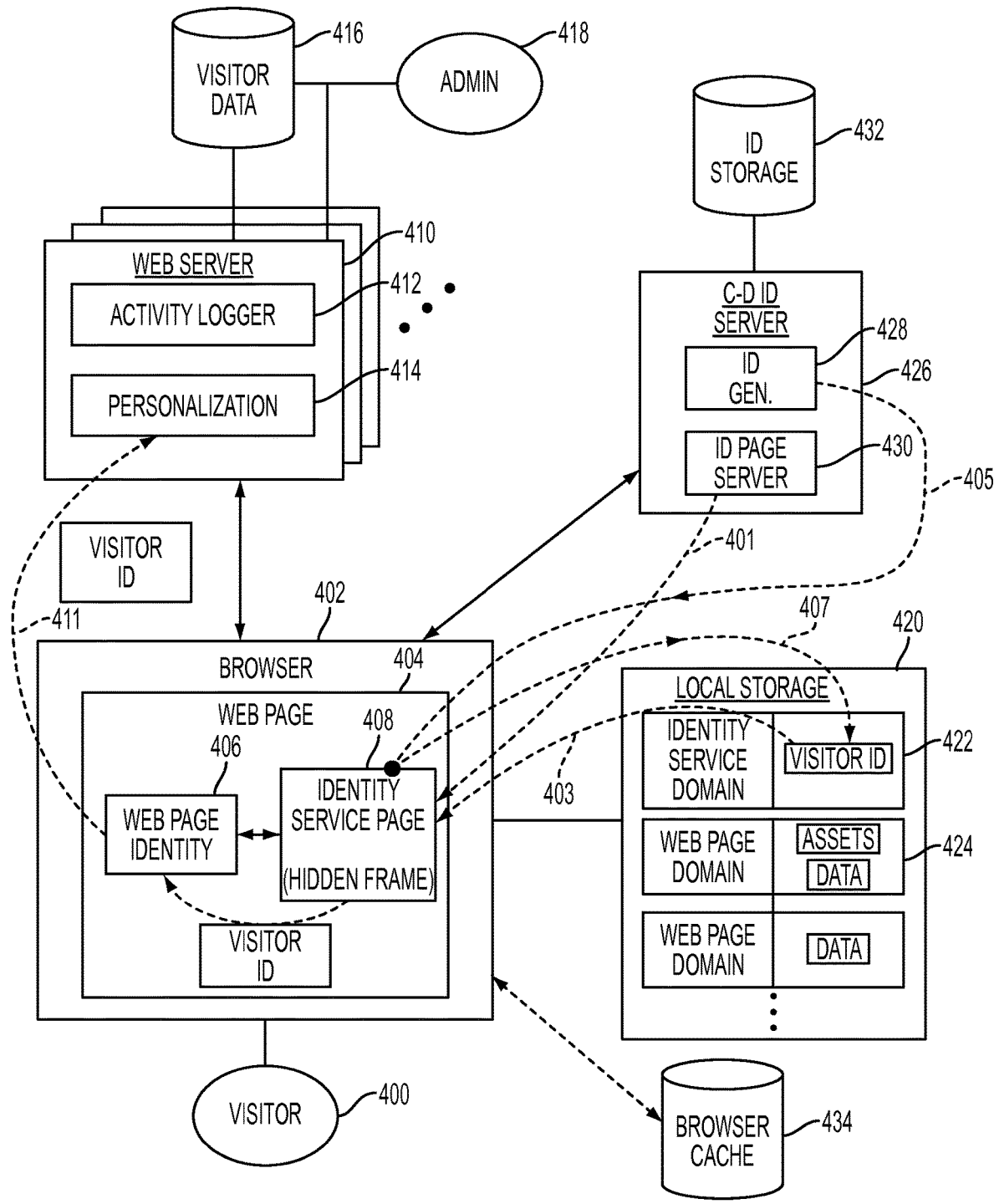
FIG. 4A illustrates a system for assigning an identity to a visitor to a web page, in accordance with an embodiment of the invention.

FIG. 4A illustrates a system for assigning an identity to a visitor to a web page, in accordance with an embodiment of the invention. The visitor 400 operates a browser 402 so as to navigate to a web page 404. The web page 404 is retrieved from a web server 410 and rendered by the browser 402 to the visitor 400. The web page 404 includes a web page identity module 406 that is configured to obtain an ID for the visitor and return the ID of the visitor to the web server 410. The web page identity module 406 obtains the ID by requesting an identity service page 408 to be loaded in a hidden frame of the rendered web page 404. The identity service page 408 is thus instantiated within the context of the web page 404, but is not visible to the visitor 400. The request for the identity service page 408 is serviced by an identity server 426, and more specifically, by an identity page server 430 defined by the identity server 426, which returns the identity service page 408 in response to the request that is generated from the web page 404 (ref. 401).

In some embodiments, it is contemplated that the hidden frame is and iframe. However, it will be appreciated that in other embodiments, the hidden frame can be broadly construed to encompass any type of frame or sub-context that may be instantiated within the context of a rendered web-page, and which may provide for the loading of the identity service page 408 as described herein. Upon loading in the hidden frame, the identity service page 408 is configured to retrieve an ID for the visitor. To accomplish this, first, a local storage API call is performed to determine whether an ID of the visitor is already stored in local storage 422 that is designated for the domain of the identity service page 408. If a visitor ID is already stored to the local storage 422 of the identity service page domain, then the visitor ID is retrieved from the local storage 422 by the identity service page 408 (ref. 403). The visitor ID is then passed back to the web page identity module 406 of the web page 404, which in turn communicates the visitor ID to the web server 410.

If the visitor ID does not exist in the local storage 422 associated with the identity service page domain, or if such a local storage does not yet exist, then the identity service page 408 is configured to request the visitor's ID from the identity server 426. In response to such a request, the identity server 426 may trigger an ID generator 428 to generate a new ID for the visitor. The new ID is then both stored to an ID storage 432, and returned to the identity service page 408 (ref. 405), which stores the new ID to the local storage 422 that is associated with the identity service domain (ref. 407). The identity service page 408 passes the new ID back to the web page identity module 406, for communication to the web server 410.

It will be appreciated that various local storage data 420 can be defined in association with various domains. For example, a local storage 424 may be designated for the domain of the web page 404. Data, assets, or other data items can be stored to the local storage 424 in association with the domain of the web page. It should be appreciated that items that are stored to a local storage persist beyond the viewing of the page or the current browser session, and are available for retrieval during subsequent page visits (of the same domain) or subsequent browser sessions. The local storage data 420 is defined by the browser 402 to permit data to be stored locally at the client device in association with specific domains for later retrieval.

It will be appreciated that the visitor ID can be defined by any string of alphanumeric characters that may serve to uniquely identify a particular visitor to a web page. In some embodiments, the visitor ID is specifically a number. Strictly speaking, the visitor ID identifies the browser that is operated by the visitor, rather than the actual visitor himself/ herself, as the identity of the visitor may not be known in an absolute sense. However (excepting situations such as public computing devices which are operable by any number of users), it may reasonably be assumed that a given browser is operated by the same visitor, or the same plurality of visitors (e.g. a computer used by members of a family), and thus identification of the browser also serves to identify the visitor.

As has been noted, the ID of the visitor obtained by the identity service page 408 is returned to the webpage identity module for (ref. 409). The webpage identity module 406 communicates the visitor ID to the web server 410 (ref. 411), where it may be utilized for various purposes. For example, with continued reference to FIG. 4A, the Web server 410 may define an activity logger 412 that is configured to log activity data of the visitor 400 and store the activity data in association to the ID of the visitor. In this manner, a history of the visitor's activity at the domain defined by the Web server 410 can be built up over time even though the visitor 400 may remain anonymous. The activity data can be stored to a visitor data storage 416, and may include, by way of example without limitation, page views, clicks, media playback activity, and other types of interactions.

In another embodiment, the functionality of the activity logger can be defined at a marketing server distinct from the web server 410. The marketing server can receive the ID of the visitor along with the activity data of the visitor 400 for storage in association with each other. As the activity data can be defined from activity across multiple domains, the marketing server can thus store and retrieve activity data for a given visitor ID pertaining to activity at multiple domains.

Furthermore, such logged activity can serve as the basis for providing personalized content to the visitor 400, even though the visitor may be anonymous. To this end, the Web server 410 includes personalization logic 414, which can be configured to provide personalized content on the webpage 404 based on the visitor ID. It will be appreciated that personalized content can be defined by customized selection, ordering, or any other kind of adjustment of content that can be provided to the visitor via webpage 404 based on data stored in association with the visitor's ID. In one embodiment, a visitor profile is defined for the visitor ID based on the logged interaction activity that has been recorded and associated to the visitor ID. The visitor profile can define preferences deduced from the visitor's interaction activity, demographic data, client device information, browser type, etc.

It will be appreciated that the personalization of content for the visitor 400 that is based on the visitor ID may be based not only on interactions that have occurred at the current domain of the current webpage 404, but also on interactions that have occurred at other domains, and which have been logged in association with the same visitor ID. Because the visitor ID can be utilized in this manner to track interactions by an anonymous visitor across different domains, improved personalization of content can be provided on a web page, notwithstanding that the visitor has yet to provide identifying information that would otherwise allow their interactions to be tracked with ease. In one embodiment, the aforementioned visitor profile can be constructed based on logged activity from multiple domains, provided that such activity has been logged in association with the same visitor ID. An administrator 418 with the appropriate privileges may access the logged visitor data across different domains.

As noted above, the identity service page 408 can be retrieved from the identity server 426. However, in another embodiment, the identity service page 408 can be retrieved from a browser cache 434, if the identity service page has been cached from a previous visit.

Figure 4B:
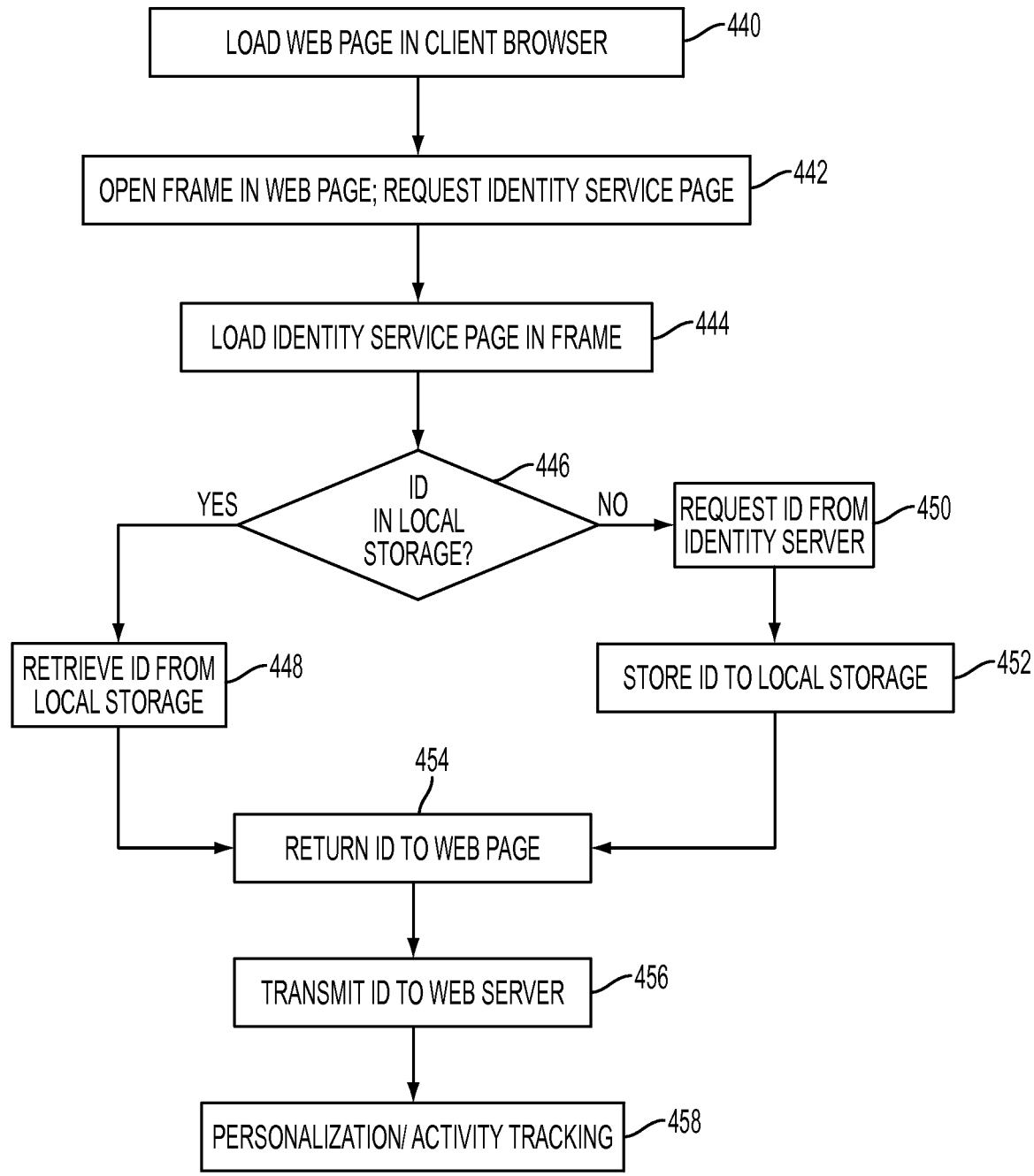
FIG. 4B illustrates a method for acquiring an ID of a visitor to a web page, in accordance with an embodiment of the invention.

FIG. 4B illustrates a method for acquiring an ID of a visitor to a web page, in accordance with an embodiment of the invention. At method operation 440, a web page is loaded in a page window of a client browser application. At method operation 442, a frame is opened within the context of the web page, and a request is made to an identity server to retrieve an identity service page. At method operation 444, the identity service page is retrieved and loaded in the frame.

At method operation 446, it is determined whether a visitor ID is already stored in local storage associated with the domain of the identity service page. If yes, then at method operation 448, the visitor ID is retrieved from the local storage. If no, then at method operation 450, a request for a new ID is sent to the identity server. At method operation 452, the new ID is returned to the identity service page, and stored to the local storage of the domain of the identity service page.

At method operation 454, the visitor ID is communicated to the web page. At method operation 456, the ID is transmitted to the web server of the web page. At method operation 458, the visitor ID is utilized by the web server to provide personalized content on the web page, and also to permit logging of activity by the visitor.

Figure 4C:
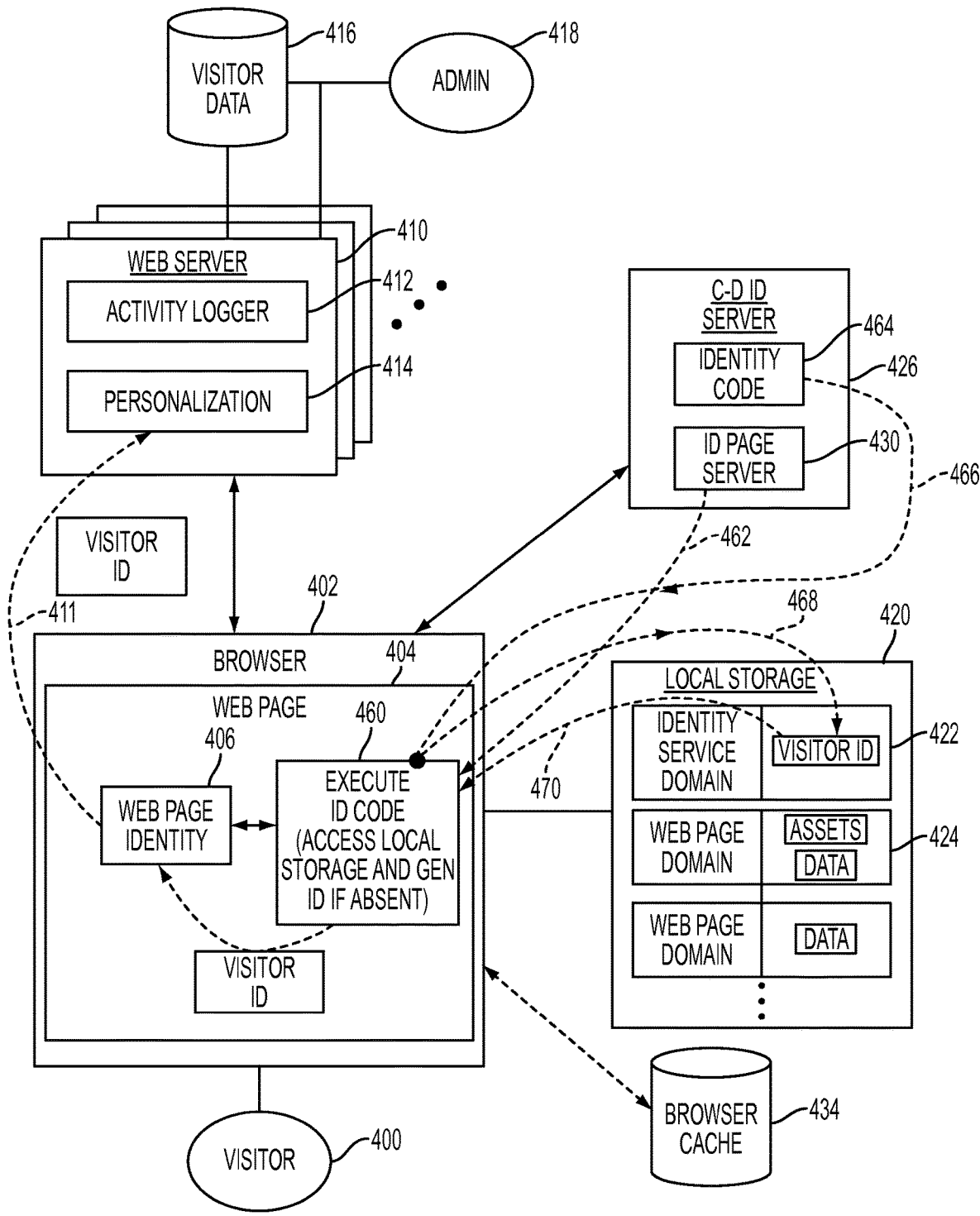
FIG. 4C illustrates a system for assigning an identity to a visitor to a web page, in accordance with an embodiment of the invention.

In an alternative embodiment, the visitor ID can be locally generated by a client. FIG. 4C illustrates a system for assigning an identity to a visitor to a web page, in accordance with an embodiment of the invention. The embodiment of FIG. 4C is similar to that of FIG. 4A, except that the visitor ID is locally generated at the visitor's browser 402. The visitor 400 operates a browser 402 so as to navigate to a web page 404. The web page 404 is retrieved from a web server 410 and rendered by the browser 402 to the visitor 400. The web page 404 includes a web page identity module 406 that is configured to obtain an ID for the visitor and return the ID of the visitor to the web server 410. The web page identity module 406 obtains the ID by requesting an identity code 464 to be loaded in a hidden frame of the rendered web page 404 (ref. 466). The identity code executes within the context of the web page 404 (ref. 460), but is not visible to the visitor 400. The request for the identity code 464 can be serviced by an identity server 426, and more specifically, by an identity page server 430 defined by the identity server 426, which returns the identity code 464 in response to the request that is generated from the web page 404 (ref. 462).

In some embodiments, it is contemplated that the hidden frame is an iframe. However, it will be appreciated that in other embodiments, the hidden frame can be broadly construed to encompass any type of frame or sub-context that may be instantiated within the context of a rendered webpage, and which may provide for the loading of the identity code 464 as described herein. Upon loading in the hidden frame, the executing identity code 460 is configured to retrieve/generate an ID for the visitor. To accomplish this, first, a local storage API call is performed to determine whether an ID of the visitor is already stored in local storage 422 that is designated for the domain of the identity code 464. If a visitor ID is already stored to the local storage 422 of the identity code domain, then the visitor ID is retrieved from the local storage 422 by the executing identity code 460 (ref. 470). The visitor ID is then passed back to the web page identity module 406 of the web page 404, which in turn communicates the visitor ID to the web server 410.

If the visitor ID does not exist in the local storage 422 associated with the identity service page domain, or if such a local storage does not yet exist, then the executing identity code 460 is configured to locally generate the visitor ID. The new ID is stored to the local storage 422 that is associated with the identity code domain (ref. 468). The executing identity code 460 passes the new ID back to the web page identity module 406 for communication to the web server 410.

As noted above, the identity code 464 can be retrieved from the identity server 426. However, in another embodiment, the identity code 464 can be retrieved from a browser cache 434, if the identity code has been cached from a previous visit.

Figure 4D:
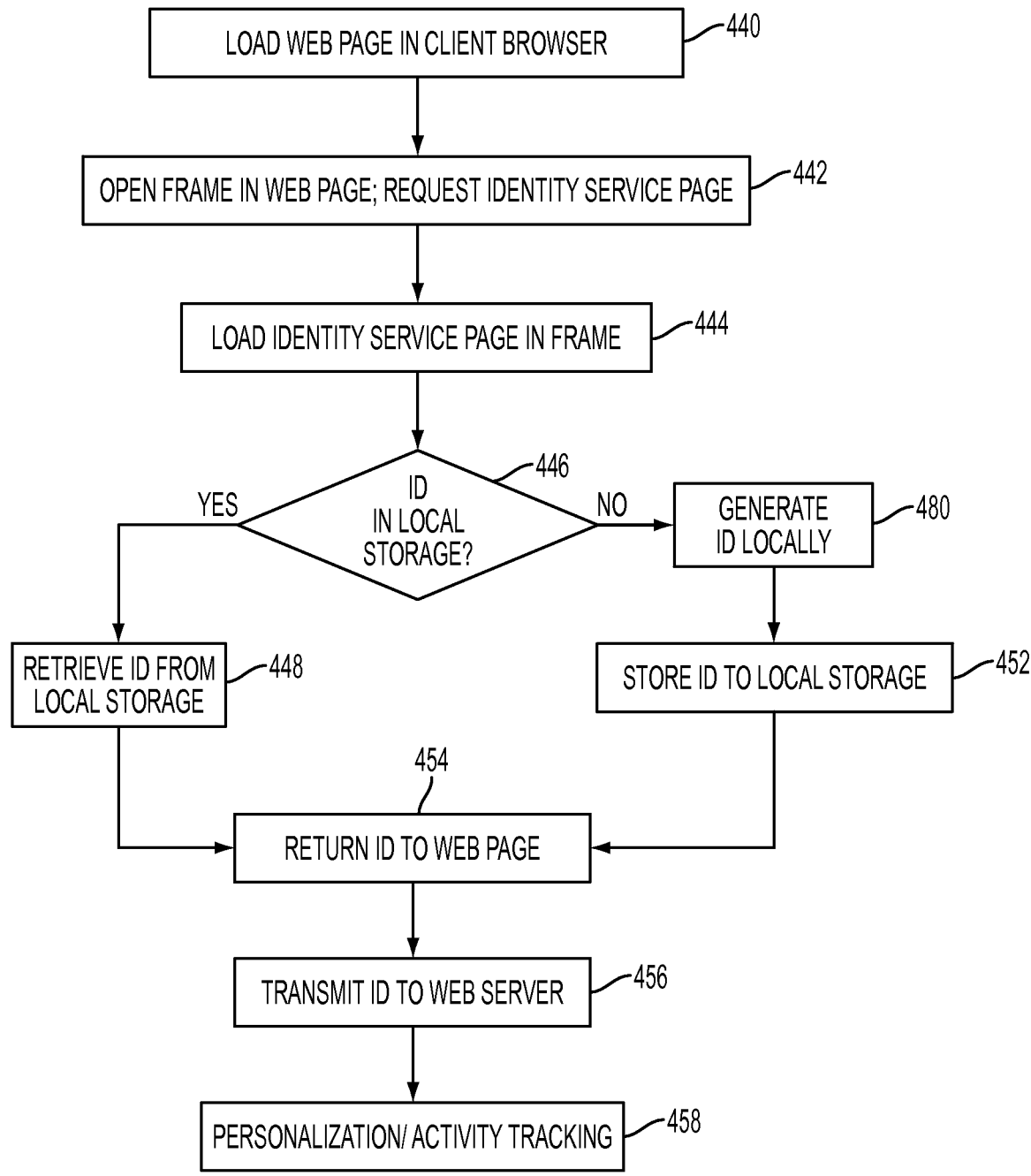
FIG. 4D illustrates a method for acquiring an ID of a visitor to a web page, in accordance with an embodiment of the invention.

FIG. 4D illustrates a method for acquiring an ID of a visitor to a web page, in accordance with an embodiment of the invention. The embodiment of FIG. 4D is similar to the embodiment of FIG. 4B, except that a visitor ID can be generated locally at a client. At method operation 440, a web page is loaded in a page window of a client browser application. At method operation 442, a frame is opened within the context of the web page, and a request is made to an identity server to retrieve an identity service page. At method operation 444, the identity service page is retrieved and loaded in the frame.

At method operation 446, it is determined if a visitor ID is already stored in local storage associated with the domain of the identity service page. If yes, then at method operation 448, the visitor ID is retrieved from the local storage. If no, then at method operation 480, a new ID is locally generated. At method operation 452, the new ID is returned to the identity service page and stored to the local storage of the domain of the identity service page.

At method operation 454, the visitor ID is communicated to the web page. At method operation 456, the ID is transmitted to the web server of the web page. At method operation 458, the visitor ID is utilized by the web server to provide personalized content on the web page, and also to permit logging of activity by the visitor.

Figure 5:
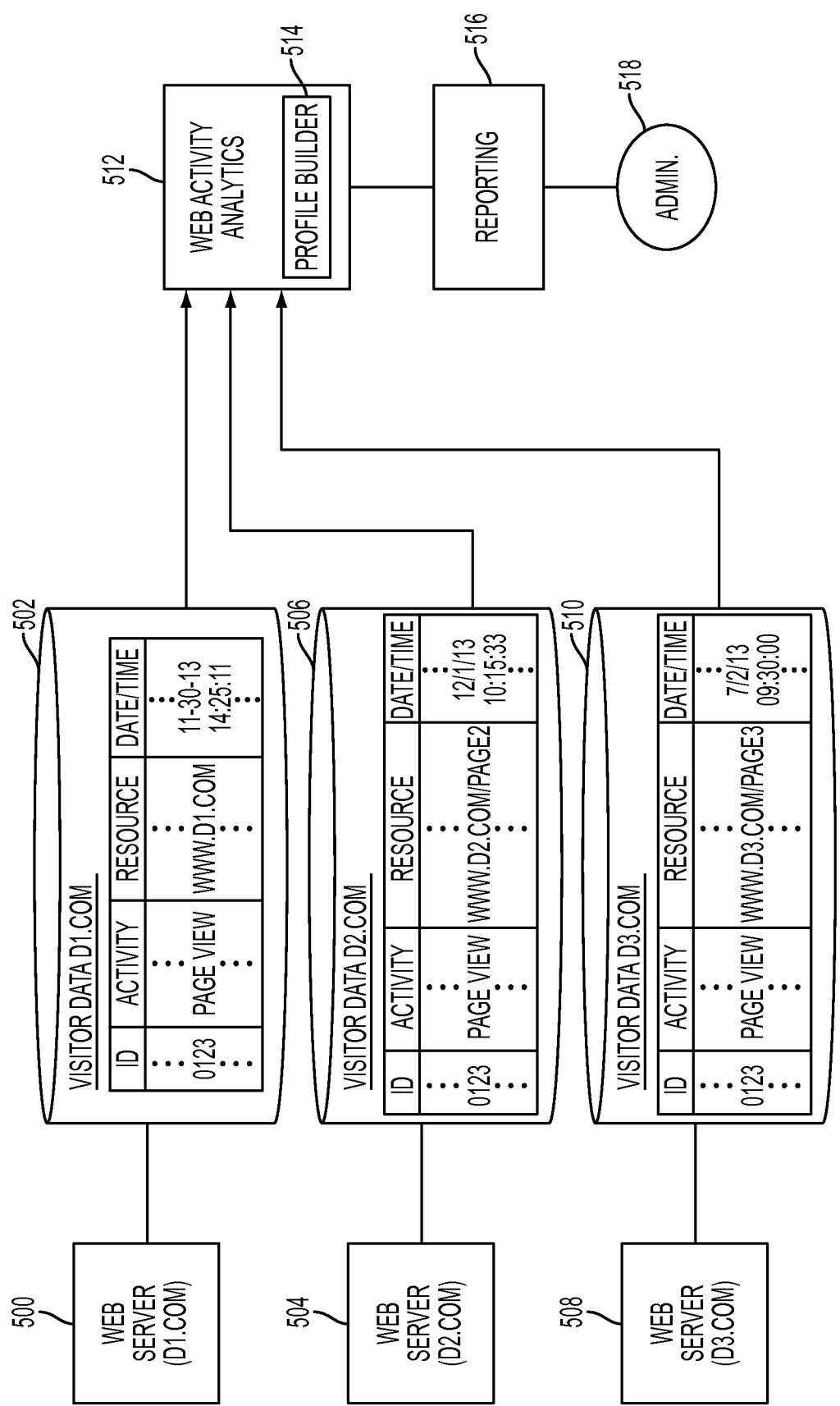
FIG. 5 illustrates examples of visitor data which have been logged from user activity on different domains, in accordance with an embodiment of the invention.

FIG. 5 illustrates examples of visitor data that has been logged from user activity on different domains, in accordance with an embodiment of the invention. The web server 500 is configured to log visitor activity occurring at an exemplary domain www.d1.com, to a visitor data storage 502. Similarly, web server 504 logs visitor activity occurring at an exemplary domain www.d2.com, to a visitor data storage 506. And web server 508 logs visitor activity occurring at an exemplary domain www.d3.com, to an activity data storage 510. As shown in the illustrated embodiment, pageview activity by a visitor having an ID "0123" has been logged for each of the exemplary domains. Because the same ID is utilized by each domain's web server to log activity occurring at each respective domain, data can be consolidated across the several domains by retrieving activity data associated to the visitor ID.

In one embodiment, a web activity analytics module 512 is provided to perform analysis of visitor activity occurring across different domains. This can include building a timeline of activity across the different domains for a specific visitor, as well as analyzing the combined activity to identify patterns, trends, preferences, or any other analytical constructs of interest to help the administrator better understand the visitor's activity. In one embodiment, a profile builder 514 is provided to construct a profile of a particular visitor based on the logged activity of the visitor. A reporting module 516 is configured to generate reports for an administrator 518 regarding the activity or profile of the visitor.

Figure 6:
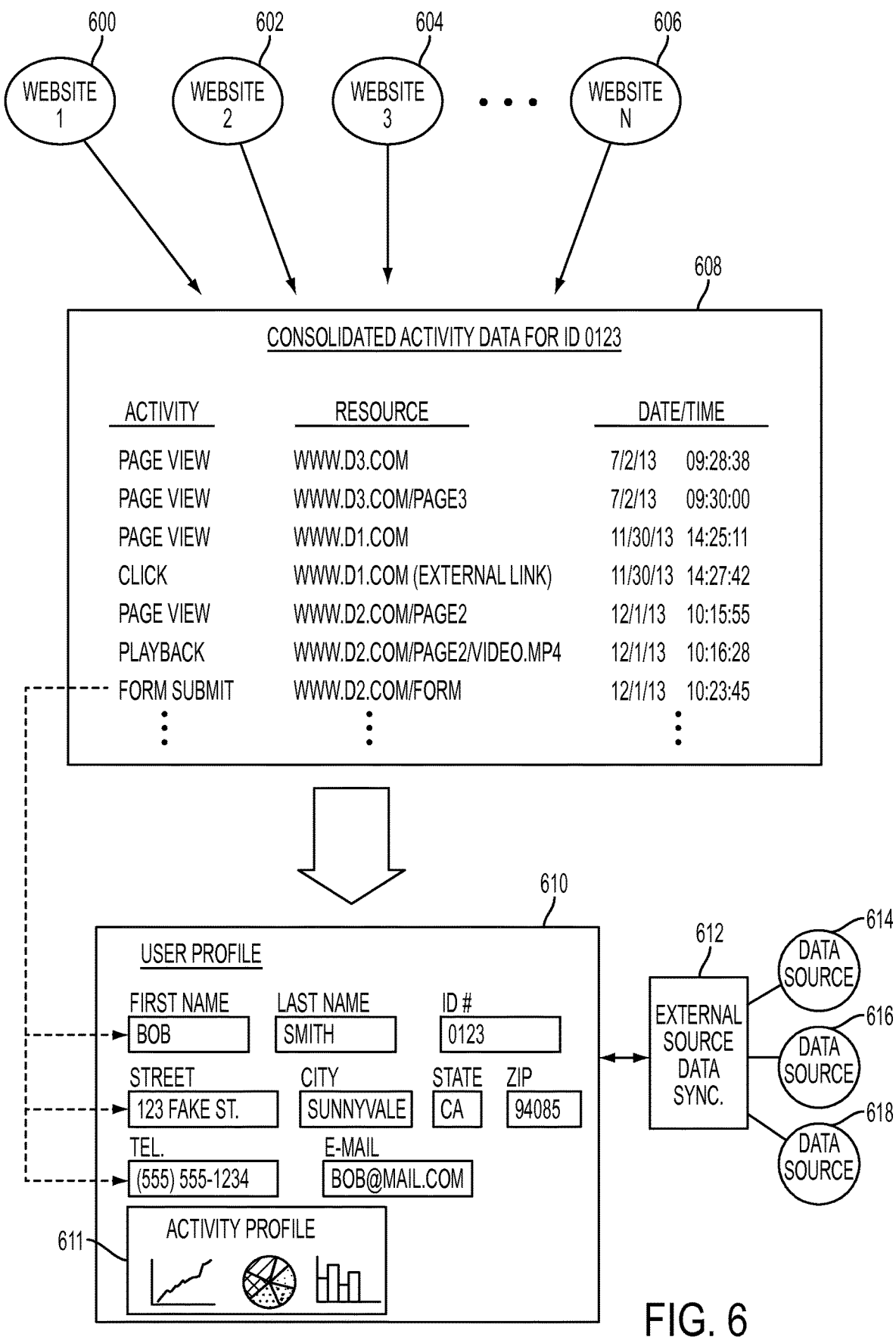
FIG. 6 illustrates the consolidation of activity data for a given visitor, in accordance with an embodiment of the invention.

FIG. 6 illustrates the consolidation of activity data for a given visitor, in accordance with an embodiment of the invention. In the illustrated embodiment, a given visitor interacts with a plurality of websites which are conceptually shown by refs. 600, 602, 604, and 606. The activity data of the visitor are stored in association with a single visitor ID. Thus, the activity data from the various websites accessed by the visitor can be consolidated, as indicated at ref. 608, which provides a listing of activity data by the visitor. In one embodiment, the activity data may define a specific activity (e.g. pageview, click, opening/playback of media, form submission, etc.), a resource (e.g. an address or name of a data item or file), a date and time of the activity, etc. Such activity data has been logged in association with the ID of the visitor by each of the websites. Accordingly, retrieval of activity data associated with the visitor's ID from each of the websites provides for consolidation of the visitor's activity data. The above-described parameters which may define activity data are provided by way of example only, without limitation. It should be appreciated that in various embodiments, the activity data may be defined by any type of data, having any format, that is useful for identifying and logging an interactive event by a visitor at a given domain.

As shown with continued reference to FIG. 6, the consolidated activity data 608 for the visitor ID "0123" includes various page view, click, playback, and form submission activity. Without the ability to track the visitor's activity across different web domains, the form submission would appear to only be the result of interactions occurring at the www.d2.com domain. However, because the visitor's prior interactions on the domains www.d3.com and www.d1.com can be recognized in conjunction with the activity at www.d2.com (because all are associated to the same visitor ID), the influence of these earlier interactions can be assessed, whereas previously, such prior interactions by the visitor occurring at different domains would not have been accounted for.

In the illustrated embodiment, the form submission activity includes the submission of personal data such as name, address, and contact information (e.g. telephone number, e-mail address, etc.). When a visitor identifies himself/herself through the submission of personal identifying information, a user profile 610 can be constructed for the visitor, including the personal information. Furthermore, the user profile can include information based on the visitor's prior activity extending over multiple domains. As discussed herein, such information may already exist, in which case it may be mapped to the user profile 610. In one embodiment, information that is determined by analyzing the visitor's prior activity over the multiple domains defines an activity profile 611 that is stored as part of the user profile 610. The activity profile 611 may define various activity-related metrics and information determined by analyzing the visitor's prior activity data.

In one embodiment, the user profile 610 can be supplemented by an external source data synchronization logic 612 that is configured to retrieve additional data about the visitor from various data sources (refs. 614, 616, 618). The data synchronization logic 612 utilizes existing information from the user profile to match against that of the external data sources, and based on matching information, additional supplemental data pertaining to the visitor can be retrieved from the external data sources. This may permit certain types of information in the user profile 610 to be filled in even if they have not been provided directly by the visitor himself/herself.

Figure 7:
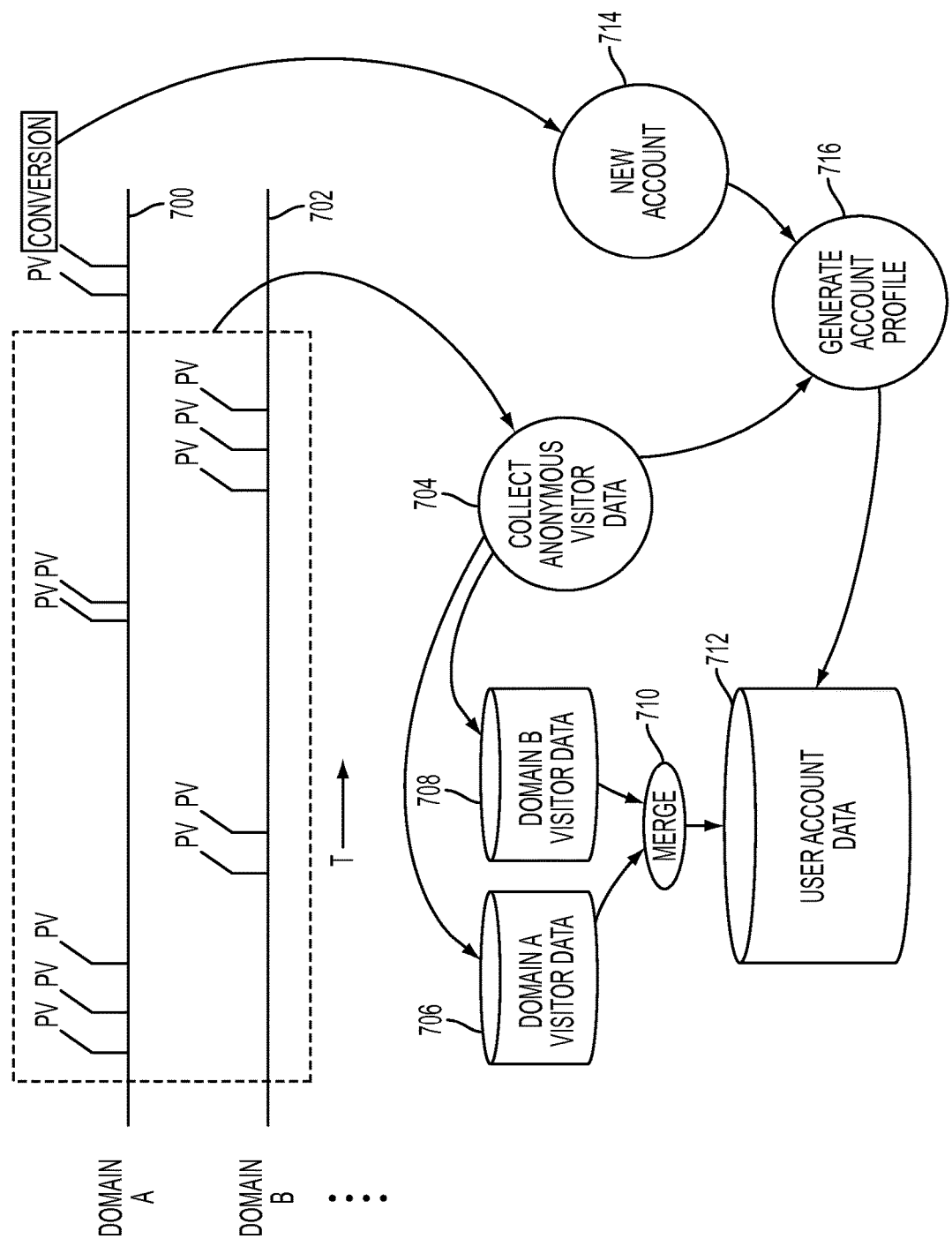
FIG. 7 conceptually illustrates the merging of previously collected activity data of a user across different domains, following a conversion activity, in accordance with an embodiment of the invention.

FIG. 7 conceptually illustrates the merging of previously collected activity data of a user across different domains, following a conversion activity, in accordance with an embodiment of the invention. In the illustrated embodiment, a timeline 700 illustrates activity by the user over time at a domain "A." Along the timeline, various page views are indicated, though it should be appreciated that other types of activity can be recorded. The latest activity represented along the timeline 700 is a conversion activity. A conversion activity will be understood as an activity wherein the user supplies identifying information, such as an e-mail address, name, telephone number, street address, etc., so as to enable the creation of a new user account that will be associated with the user.

A timeline 702 is also shown, illustrating the user's activity at a domain "B." Various page views at domain "B" are represented along the timeline 702. As can be seen, the page view activity by the user has alternated over time between the domain A and domain B, with the conversion activity occurring finally at domain A. The activity by the user at each of the domains is collected over time and stored in association with an ID designated for the user's browser. Prior to the conversion activity by the user, the user is considered to be an anonymous visitor for whom activity data is nonetheless collected (ref. 704) and stored. The activity data for domain A are stored to a data storage 706; whereas the activity data for domain B are stored to a data storage 708. The activity data of the user for each of the domains is stored in association with the same ID, thereby permitting later retrieval of such activity data across different domains for the user based on the ID.

Upon the conversion activity by the user, a new user account is generated (ref. 714) based on the identifying personal information supplied by the user. Additionally, the previously logged activity data which has been stored in association with the user's ID can be associated to the user's account. In one embodiment, this may be defined by a merge of the user's previously recorded activity data from the various domains (ref. 710). It will be appreciated that this merging of data is facilitated by the retrieval of activity data from each of the domains that is associated to the user's singular ID. The merged data can be stored to a user account data storage 712 in association with the user's account.

Additionally, an account profile can be generated based on the user's prior activity data across the different domains (ref. 716). By way of example, the account profile can define various features to associate to the user's account which have been determined based on analysis of the user's prior activity data. Such features may specify any data point of interest regarding the user's prior activity, such as specific domains visited, number of page views, lengths of time between visits, average number of visits over time, relative concentration or amount of visits to different domains, amount of exposure to particular types of information, types of interactions at various domains, responses or lack thereof to presentations or invitations, etc.

Figure 8:
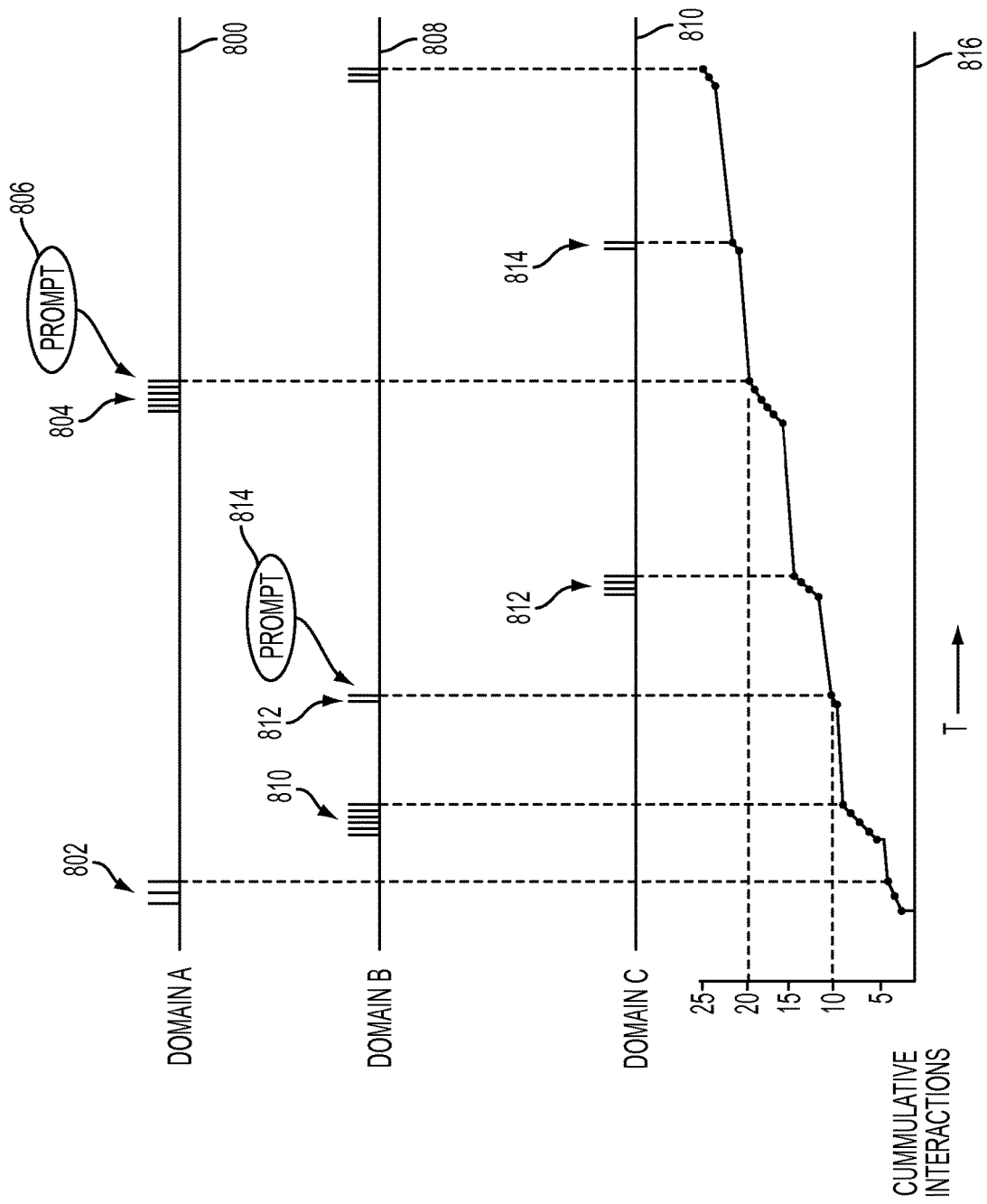
FIG. 8 illustrates the accrual of activity across different domains, utilized to determine when to prompt a user, in accordance with an embodiment of the invention.

FIG. 8 illustrates the accrual of activity across different domains, utilized to determine when to prompt a user, in accordance with an embodiment of the invention. A timeline 800 illustrates activity by a user at domain A over time; a timeline 808 illustrates activity by the user at domain B; and a timeline 810 illustrates activity by the user at domain C. Along each timeline, interactions or activities (e.g. page views, etc.) at the respective domain are represented. For example, along timeline 800 for domain A, three interactions are indicated at ref. 802, and six interactions are represented at ref. 804. Along timeline 808 for domain B, five interactions are represented at ref. 810, and two interactions are represented at ref. 812. Along timeline 810, four interactions are represented at ref. 812, and two interactions are represented at ref. 814.

In accordance with the principles described herein, the interactions by the user can be tracked across multiple domains as they are logged in association with the same ID. This permits, for example, cumulative interactions across multiple domains to be tracked. Graph 816 illustrates the cumulative number of interactions across the domains A, B, and C over time.

In one embodiment, the cumulative number of interactions occurring across the different domains can be utilized to determine when to prompt the user to take an action, such as providing an e-mail address, creating an account, signing up for an e-mail newsletter, purchase premium access, etc. It will be appreciated that the user may find it annoying if he/she is prompted to take action too often. However, neither is it desirable to prompt the user too infrequently, as opportunities for conversion activity may be missed. In one embodiment, the user is prompted after a given number of interactions occur, wherein the interactions are cumulative across multiple domains. In the illustrated embodiment, the user is prompted after every ten interactions occur, as indicated at ref. 814 and ref. 806. At ref. 814, ten interactions have occurred, including interactions indicated by refs. 802, 810, and 812 across domains A and B. At ref. 806, a total of 20 interactions have occurred, including additional interactions indicated by refs. 812 and 804 occurring at domains C and A, respectively. It will be appreciated that the prompting of the user which occurs at ref. 814 occurs in the context of the user's visit to domain B, whereas the prompting of the user which occurs at ref. 806 occurs in the context of domain A. Thus, the user can be prompted to take action at different domains, but based on cumulative activity across the different domains.

In the above-described embodiment, the user is prompted to take action based on the cumulative number of interactions occurring across various domains. However, it will be appreciated that in other embodiments, the user may be prompted to take action based on other factors which can be determined by tracking the user's interactions across the different domains. For example, the user may be prompted based on an amount of time which has elapsed since the previous prompting of the user on any of the domains, or if a previous prompting of the user has yet to take place, then an amount of time elapsed since the first interaction by the user at any of the domains. The user may also be prompted based on the frequency of interactions occurring across domains, the types of interactions occurring across domains, etc.

Figure 9A:
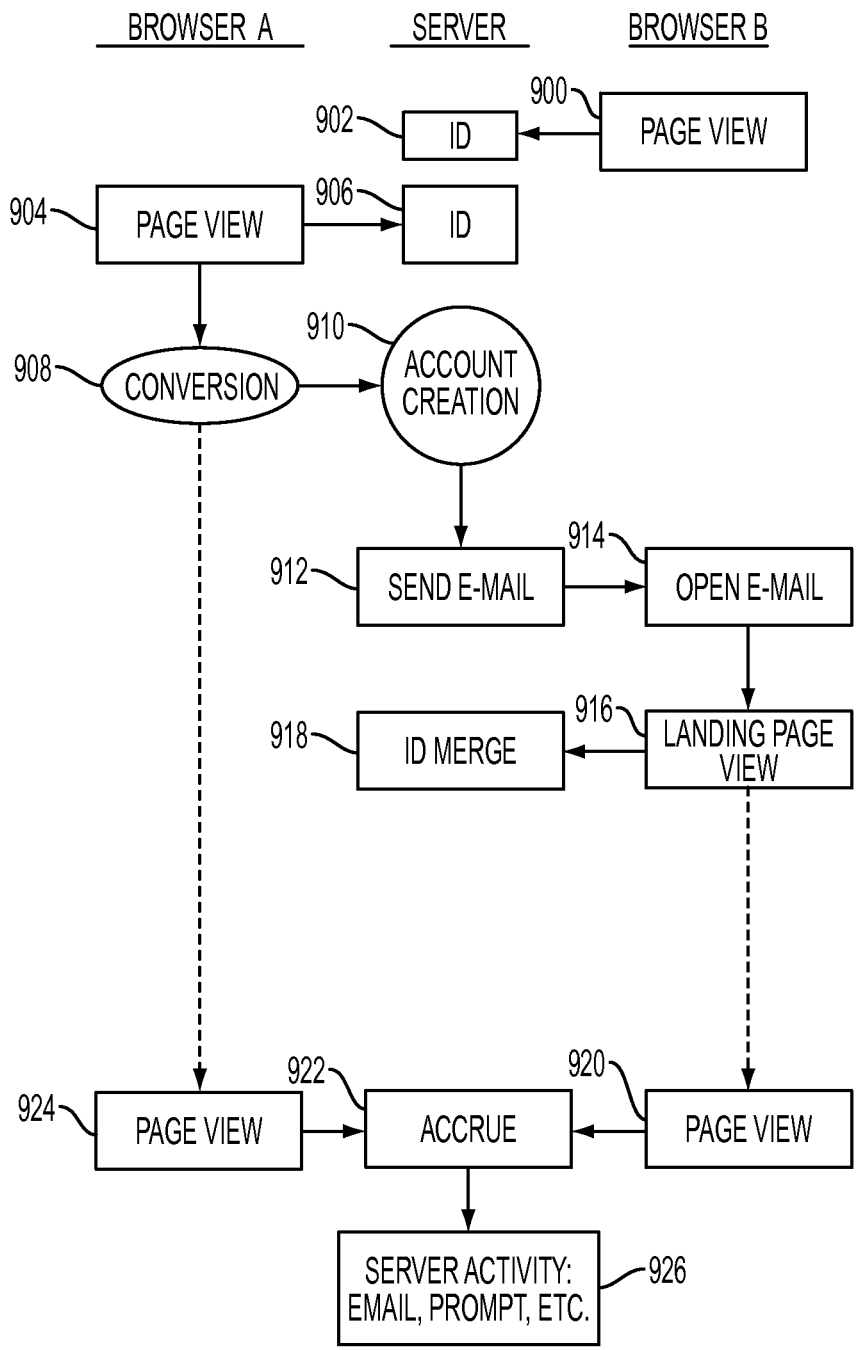
FIG. 9A is a conceptual flow diagram showing merger of activity logged from different browsers, in accordance with an embodiment of the invention.

FIG. 9A is a conceptual flow diagram showing merger of activity logged from different browsers, in accordance with an embodiment of the invention. At ref. 900, a page view occurs from a browser B, and based on this page view, an ID is assigned to the browser B at ref. 902. At ref. 904, a page view occurs at a browser A, and an ID is assigned to the browser A based on this page view. At ref. 908, a conversion activity occurs at browser A, resulting in creation of a user account, indicated at ref. 910. It will be appreciated that the account created based on the conversion activity is associated with the ID assigned to browser A, and therefore previous user activity associated with the ID of browser A, such as the page view indicated by ref. 904, can be associated with the user account. However, at this point, it is not known that the activity occurring at browser B is also that of the same user. An exemplary process which identifies browser B as also associated with the user is described below.

In one embodiment, the user account includes an e-mail of the user, to which an e-mail message is sent (ref. 912). In the illustrated embodiment, the user opens the e-mail in the browser B (ref. 914). The e-mail may contain a link to a landing page, that when clicked by the user, navigates the user to the landing page and also provides identifying information of the user (e.g. user's account name, e-mail address, etc.) to the landing page. Since the user is already identified (at least by their e-mail address to which the e-mail was sent), subsequent identifiable activity can be associated to the user's account.

When the landing page is thus opened in the browser B, it is determined that the browser B is already associated with an ID (generated at ref. 902). Thus, the activity data associated with the ID of browser B can be mapped to the user's account, in addition to that of the ID of browser A. The ID's of browser A and browser B can thus be merged or otherwise associated to the same user's account. Subsequent page views or other activity occurring at either browser (refs. 920 and 924) are accrued (ref. 922) and associated with the user's account (by virtue of the ID's of the browsers which have been linked). Based on the accrued activity occurring at both browsers A and B, various types of actions can be taken, e.g. determining when or what content to e-mail the user, determining when to prompt the user to take action, etc.

Figure 9B:
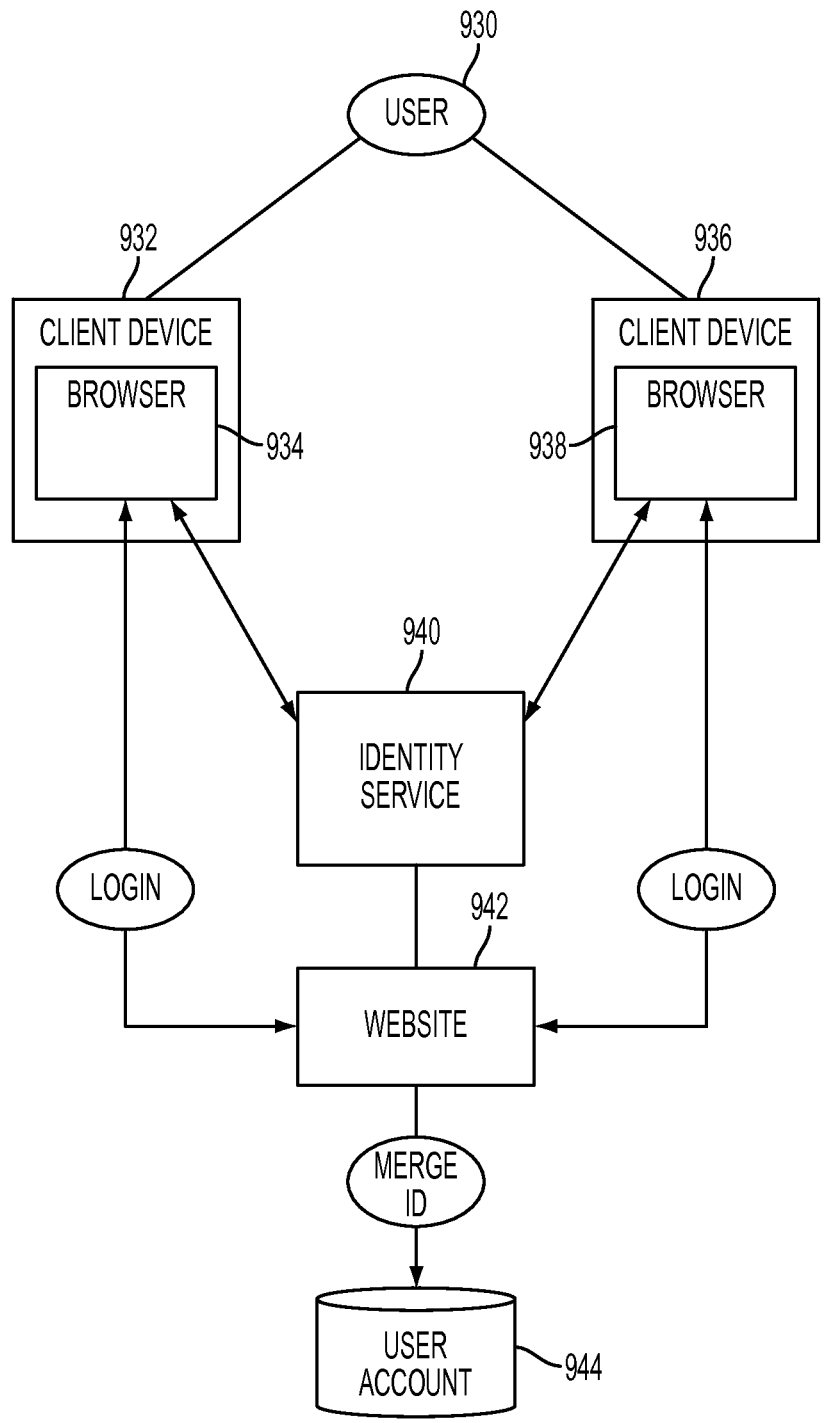
FIG. 9B illustrates a system wherein a user accesses a website via two different browsers, in accordance with an embodiment of the invention.

FIG. 9B illustrates a system wherein a user accesses a website via two different browsers, in accordance with an embodiment of the invention. The user 930 operates a browser 934 executing on a client device 932 to access a website 942. As discussed above, the browser 934 can be assigned a visitor ID by an identity service 940, such that the ID of the browser 934 allows activity via the browser 934 to be tracked across multiple websites/domains. In the illustrated embodiment, the user 930 also may operate a different browser 938 executing on another client device 936. The browser 938 also may be assigned an ID by the identity service 940, for use in identifying the browser 938 and tracking activity occurring via browser 938 on website 942 as well as others configured to retrieve the ID.

In the absence of any further identifying information, it may not be appreciated from the perspective of the website 942 that activity occurring at the website 942 via each of the browsers 934 and 938 is actually that of a single user 930. However, if a common identification of the user 930 occurs across both browsers, then it may be determined that website activity generated from each of the browsers belongs to the same user.

For example, when the user 930 logs in to the website 942 via the browser 934, the ID for the browser 934 is also transmitted to the website 942, and so the ID for the browser 934 can be associated to the user's login/account. And if the user also logs in to the website 942 via the browser 938, then the ID for the browser 938 can also be associated to the user's login/account. In this manner, multiple browser ID's can be merged to the same user account, thus recognizing that activity from each of the browsers is actually activity defined by the same user. In the illustrated embodiment, the association of ID's is stored to a user account 944.

Figure 10:
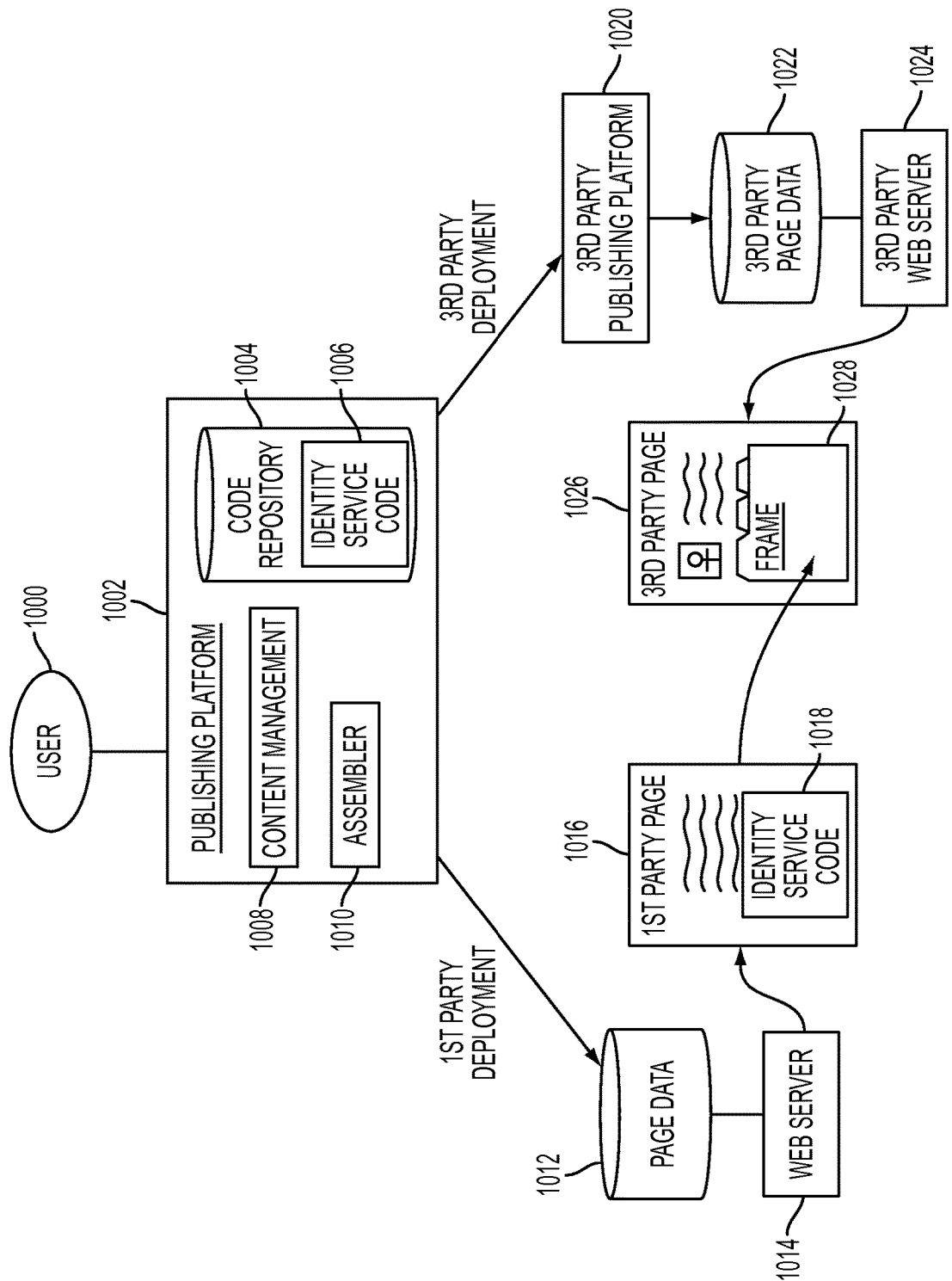
FIG. 10 illustrates a publishing platform for deploying identity service code on web pages, in accordance with an embodiment of the invention.

FIG. 10 illustrates a publishing platform for deploying identity service code on web pages, in accordance with an embodiment of the invention. A publishing platform 1002 provides tools for enabling a user 1000 to generate web pages. In the illustrated embodiment, the publishing platform 1002 includes a content management module 1008 which is configured to allow the user 1000 to define and manage content of a web page to be published. A code repository 1004 includes various code modules and portions which may be selected for inclusion in a given web page. An identity service code module 1006 is included in the code repository 1004, and when executed as part of a rendered web page, is configured to retrieve an identifier for a given browser as discussed in accordance with various embodiments described herein. The identity service code can be configured when executed to request an identity service page (as previously described) to be loaded in a hidden frame context of the web page.

The publishing platform 1002 further includes an assembler 1010 which is configured to assemble code and assets to define page data which defines a web page. In a first-party deployment scenario, the page data is stored directly to a page data storage 1012. A web server 1014 responds to requests for the web page by retrieving the page data for the web page and returning it to the client requestor, at which the page data is executed to define the web page 1016. The web page 1016 includes the identity service code 1018, that when executed, retrieves an ID for the browser in which the web page has been rendered.

In a third-party deployment scenario, the publishing platform 1002 may interface with a third-party publishing platform 1020 to store page data defining a web page to a third-party page data storage 1022. A third-party web server responds to requests for the web page, retrieving and serving the third-party web page 1026. In such an embodiment, the third-party web page 1026 includes the identity service code.

In another embodiment, a third-party web page may include a frame 1028 within which a page may be rendered. By way of example, the third-party page 1026 may be configured to retrieve the first-party page and render it within the frame 1028. In one embodiment, the third-party page is a social network page having a user-designated frame in which a user may reference another page for inclusion and rendering. In other embodiments, the third-party page can be any other type of page. In this embodiment, deployment of both a first-party page and a third-party page occurs, with the third-party page being configured to retrieve the first-party page for rendering within a sub-frame of the third-party page.

Figure 11A:
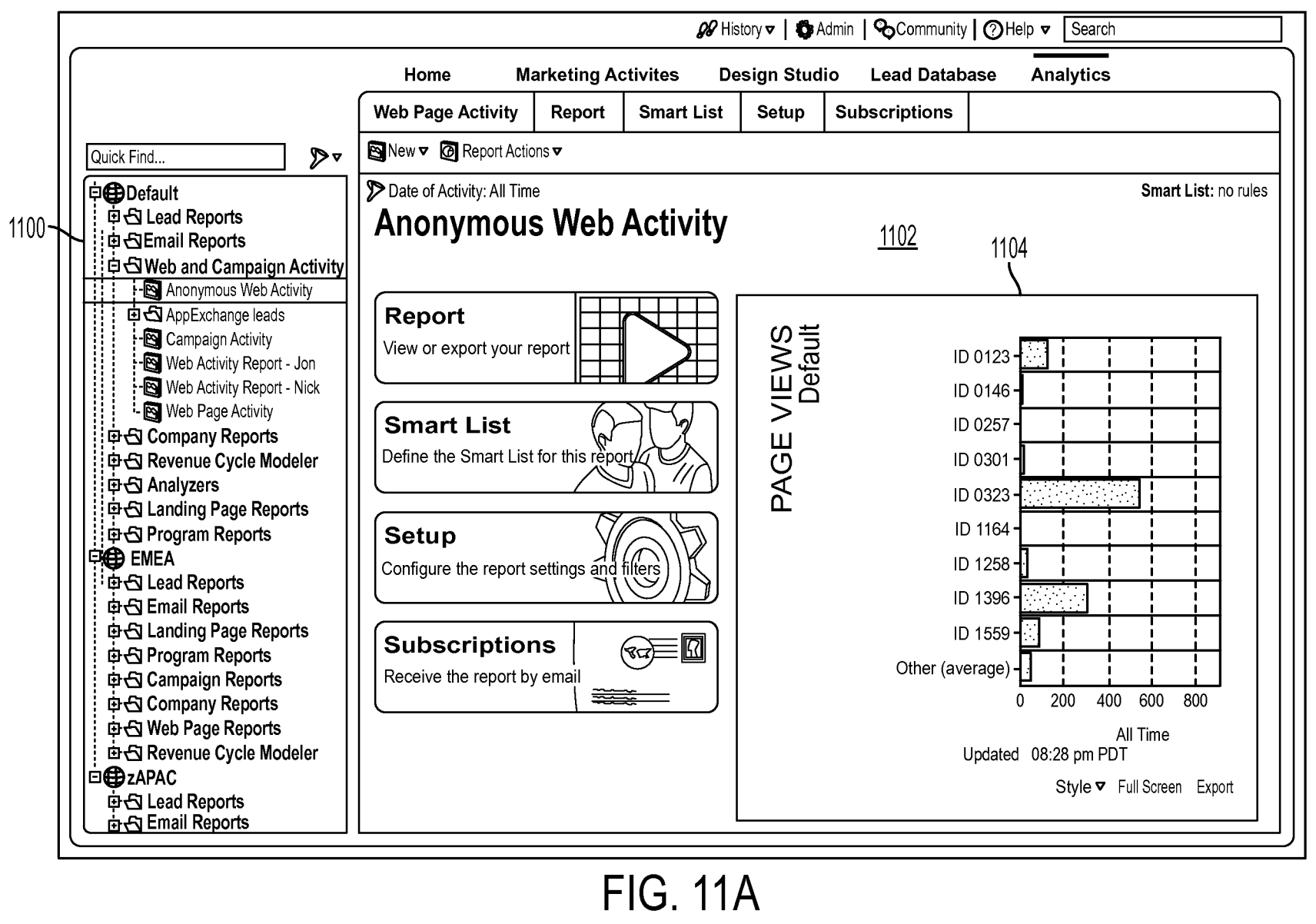

FIG. 11A illustrates an interface for viewing web activity reports, in accordance with an embodiment of the invention. Shown at left is a panel 1100 which defines a directory of options providing access various views, reports, modelers, analyzers, etc. In the illustrated embodiment, an anonymous web activity view has been selected for display. As a result, an anonymous web activity view 1102 is displayed at right. In one embodiment, the view 1102 includes a graph 1104 illustrating numbers of page views for various visitor ID's. It should be appreciated that the view 1102 can be configured to display any of various kinds of reports, graphs, charts, and analyses describing web activity by anonymous users. Additionally, options can be provided to, for example, export reports, define a customized list of visitor ID's to report, manage report settings, set up a subscription to receive reports via e-mail, etc.

Figure 11B:
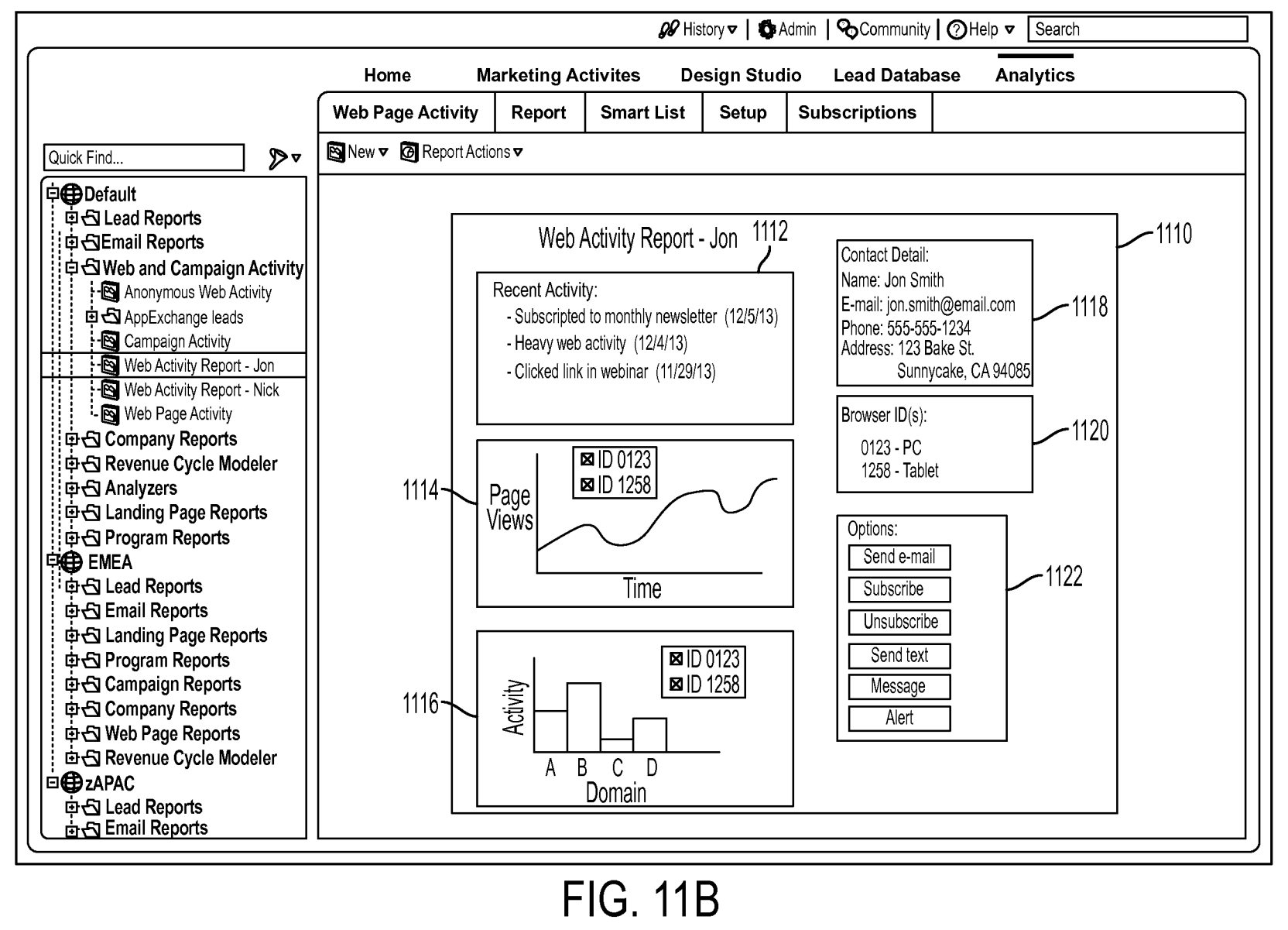

FIG. 11B illustrates an interface similar to that of FIG. 11A, but configured to display a web activity report for a specific identified user, in accordance with an embodiment of the invention. In the illustrated embodiment, a report 1110 for a user "Jon" is shown. The report includes contact information 1118 of the user, as well as a listing of specific ID's (ref. 1120) which are associated with the user. In the illustrated embodiment, the user is shown to be associated with two different ID's corresponding to browsers on two different devices. A listing of recent activity by the user is provided (ref. 1112).

A graph 1114 illustrates page view activity by the user over time. The graph 1114 can be configured to display page view activity selectively for one or both of the ID's which are associated with the user. A chart 1116 illustrates web activity by the user per domain. The chart 1116 can also be configured to display activity selectively for one or both of the ID's associated with the user.

Furthermore, various options 1122 are provided for the viewer of the report 1110 to take action with respect to the user. By way of example, such options may include sending an e-mail to the user's e-mail account, subscribing the user to a mailing list, unsubscribing the user, sending a text message, sending a private message, sending an alert to an app, etc.

Embodiments of the invention in accordance with the present disclosure provide for an identifier to be associated with a specific browser/user, wherein the identifier can be utilized to identify the browser/user across multiple domains. This provides the ability to track a given user's activity across multiple domains with ease. This ability can be especially useful for marketing purposes, as leads can be nurtured across domains. Furthermore, both anonymous and known users can be tracked amongst all of a given marketer's web presences. For example, a single entity may conduct marketing activities on multiple websites, social networks, landing pages, etc. Embodiments in accordance with the present disclosure provide the ability to track a given user's interactions on all of such sites.

Furthermore, insight is gained into cross-domain conversion activities, wherein activity on one domain contributes to a conversion activity on another domain. For example, a user might read reviews/comments on a marketer's social network page, and this may contribute to a sale on the marketer's e-commerce site. Such connections can be made with relative ease because the user's interactions at each of these locations is captured and associated with the same ID.

Additionally, the herein-described technology for tracking the user across multiple domains can be utilized to provide for user authorization across domains. For example, by tracking a user across domains, a user logged in to a first domain can navigate to a second domain while remaining logged in.

A marketing management system provides its users with the ability to collect and organize information about marketing activity conducted to produce sales opportunities. Frequently, such a system is also able to take input from a variety of sources, including a sales platform, a company's systems, and other data sources. In a marketing management system, an opportunity may be defined as a record in a database system indicating a point in time when a sales representative may start to interact with a potential customer. Marketers may conduct numerous activities to generate leads—people that could become opportunities—for sales representatives to contact and close sales opportunities, including producing whitepapers, distributing online web content, attending trade shows, conducting webinars to demonstrate a product, and following up with prospective customers. Once leads have been generated and nurtured into potential sales opportunities, meaning that customers' needs have been identified, sales representatives follow up to verify whether there is a genuine buying intent. If such intent exists, a sales opportunity is created and sales representatives will then try to close the opportunities. Each opportunity may eventually be closed by a sales representative as "won" or "lost," meaning that a sales transaction was or was not successful. Historically, marketers have been unable to attribute their marketing efforts to an individual sales opportunity, relying instead on aggregated information about sales revenue and marketing spend to justify their spending budget.

The marketing management system may gather interactions with leads performed by marketing staff and sales representatives from an external sales platform, a company's systems, and other data sources, such as spreadsheets, databases, and other records that have been created over time. Interactions with leads, organized by account and by opportunity, may be plotted along a timeline by the marketing management system, such as an indication of heavy web traffic by a lead on the company's website, an indication that a lead signed up for a webinar, an email from marketing staff opened by the lead following up on a webinar signup, an indication that the lead downloaded a whitepaper about a product, an interaction recorded by a sales platform that a sales representative contacted the lead, an indication of the lead being converted into an opportunity, and an indication of the closing the sale on the opportunity. As a result, marketing staff may analyze the impact of marketing activities on the revenue cycle at an individual opportunity level.

Figure 12:
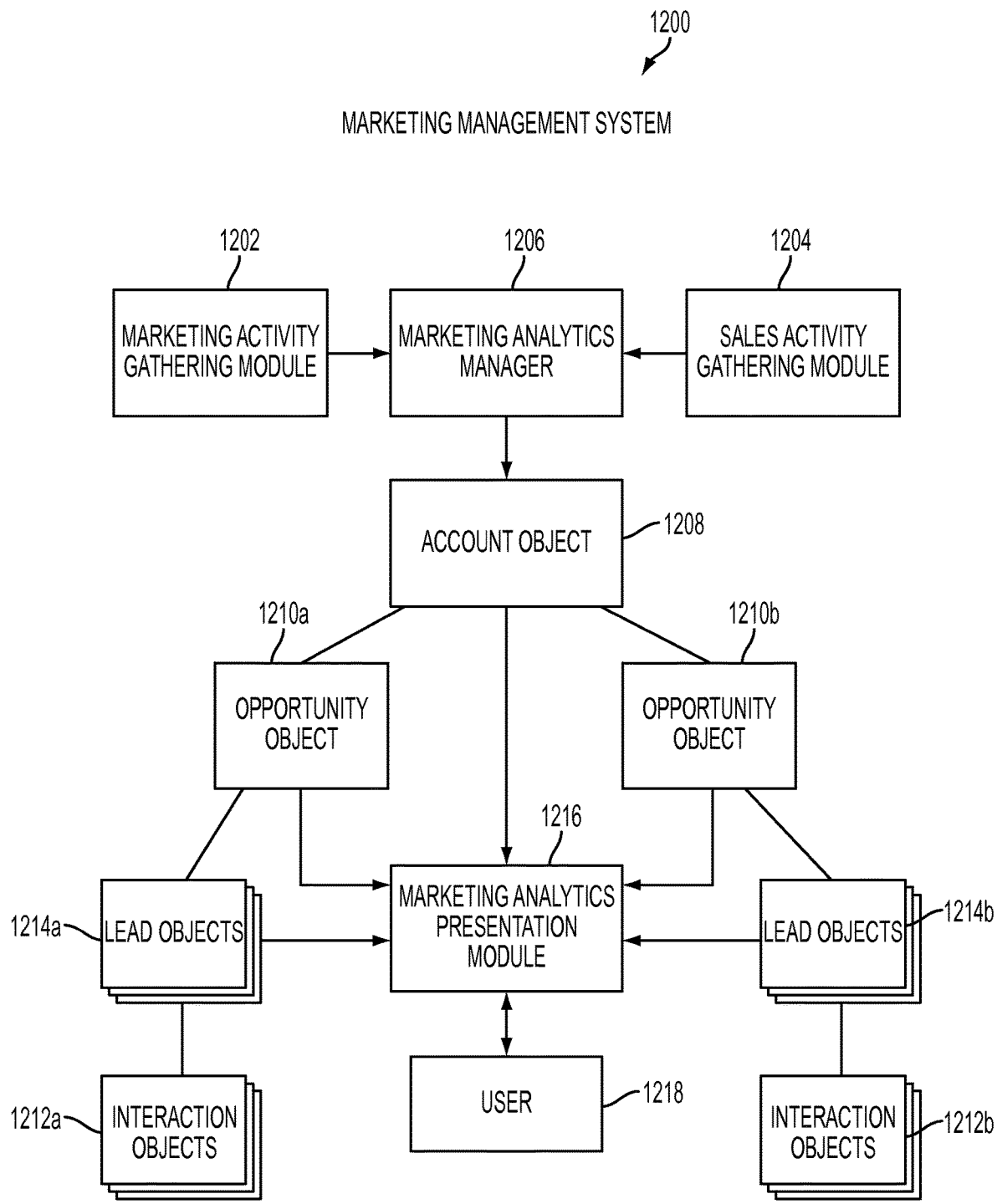
FIG. 12 illustrates a high level block diagram of a process for providing marketing analytics related to a sales opportunity over a timeline in a marketing management system, in one embodiment.

FIG. 12 illustrates a high level block diagram of a process for providing marketing analytics related to a sales opportunity over a timeline in a marketing management system, in one embodiment. The marketing management system 1200 includes a marketing activity gathering module 1202 and a sales activity gathering module 1204 that gathers information about interactions with leads associated with opportunities for a particular account. The marketing management system 1200 also includes a marketing analytics manager 1206 that receives the information about interactions with leads associated with opportunities for a particular account and generates an account object 1208 associated with a plurality of opportunity. The marketing management system 1200 may associate an interaction object 1212 with a lead object 1214 based on the content of the interaction. For example, heavy web traffic by a lead associated with a lead object 1214 may be associated with an interaction object 1212. As another example, an indication that an email was opened by the lead associated with the lead object 1214 may be associated with another interaction object 1212. In this way, the lead objects 1214 have been associated with interaction objects 1212.

To attribute marketing activity to a newly created opportunity, represented by an opportunity object 1210, marketing staff may use the marketing management system 1200 to create the opportunity object 1210, in one embodiment, and associate it with the account object 1208. When creating the opportunity object 1210, at least one lead associated with a lead object 1214 must be identified as having a role in the opportunity represented by the opportunity object 1210. Once the lead associated with the lead object 1214 is associated with an opportunity object 1210, the associated interaction objects 1212 are also associated with the opportunity object 1210. In another embodiment, marketing staff may use the marketing management system 1200 to access the opportunity object 1210 and associate it with the account object 1208. The marketing management system 1200 may be connected to an external sales platform and/or external company system. By associating the opportunity object 1210 to the account object 1208, the marketing management system 1200 may integrate the opportunity object 1210 and account object 1208 into the marketing management system 1200 via the external sales platform and/or external company system. In one embodiment, marketing staff may select leads associated with lead object 1214 to be associated with an opportunity object 1210 in a user interface provided by the marketing management system 1200. In another embodiment, a lead object 1214 is automatically associated with an opportunity object 1210 upon creation. Lead objects 1214 may be created through a user interface provided by the marketing management system 1200 and inputted by marketing staff or through application programming interface (API) calls with an external sales platform or the company's system. In a further embodiment, marketing staff may import a list of leads into the marketing management system 1200, such as a Microsoft Excel spreadsheet or comma separated value file. Lists of leads may be purchased through external vendors, for example.

As illustrated in FIG. 12, opportunity objects 1210 are provided to a marketing analytics presentation module 1216 for presentation to a user 1218 of the marketing management system 1200. The marketing analytics presentation module 1216 may present interaction objects 1212 *a* that are associated with lead objects 1214 *a* that are associated with an opportunity object 1210 *a* that is associated with an account object 1208. The user 1218 may access the opportunity object 1210 *b* associated with the account object 1208 through the marketing analytics presentation module 1216 to view interaction objects 1212 *b* associated with lead objects 1214 *b* that are associated with the opportunity object 1210

*b*. When an opportunity associated with an opportunity object 1210 closes, based on information received from the sales platform, the amount of the sale may be attributed to the interaction objects 1212 associated with the opportunity object 1210. In one embodiment, the interaction objects 1212 may include detail information, such as the date of the interaction, cost of the marketing activity, text associated with the interaction, and the lead object 1214 associated with the interaction. As a result, the marketing analytics presentation module 1216 may present a plotted graph of cumulative interactions over a timeline. In another embodiment, the marketing analytics manager 1206 may compute an influence score for each interaction object 1212 so that the marketing analytics presentation module 1216 may present a plotted graph of the cumulative influence scores of the interaction objects 1212 associated with the opportunity over a timeline.

The marketing analytics presentation module 1216 may also present lead objects 1214 associated with the opportunity in a separate user interface from the plotted graph of cumulative interaction objects 1212 over time. In a leads user interface, the marketing analytics presentation module 1216 may present the leads associated with the opportunity as well as other leads associated with the account. In the leads user interface, the number of historical interactions may be displayed in conjunction with the names of the leads. The user 1218 may select other leads that have not been associated with the opportunity object 1210 from the leads user interface to visualize the cumulative interaction objects 1212 including interaction objects 1212 associated with the selected leads. The user 1218 may also indicate that a selected lead in the leads user interface has a role in the opportunity. By selecting additional leads, the plotted graph may be refreshed by the marketing analytics presentation module 1216 to include the historical interactions of the additional leads.

Leads are clearly identified in the leads user interface provided by the marketing analytics presentation module 1216. Organized by week, a plot point on the plotted graph grows as more interactions occurred during that week on the timeline. The marketing analytics presentation module 1216 may also enable the user 1218 to click on each plotted point to view a detailed listing of interactions that occurred during that week. As a result, a user 1218 viewing the plotted graph may visualize more interactions as the plotted point corresponds to the number of interactions that occurred in that week.

Users of the marketing management system 1200 may quickly identify which programs touched the leads and when marketing activity and sales activity began for opportunities for each account. The plotted graph shows the accumulated interactions from the first touch for any lead to the last. As more interactions are accumulated over time, the plotted points are connected with a line. The curve of the line rendered by the marketing management system 1200 indicates to a viewer how marketing activities influence an opportunity to create or to close. A higher vertical slope of the line indicates that more interactions occurred in a shorter time period. Once an opportunity is created, an area of the plotted graph under the line to the x-axis may be shaded by the marketing analytics presentation module 1216 to indicate the interactions that directly contributed to closing the opportunity. This shaded area provides a visual representation of the interactions performed by marketing staff and sales representatives that lead to a conversion. In another embodiment, the graph illustrates a defined influence of the marketing activities to the opportunity creation where the influence is defined using different weights assigned to different marketing activities.

As a result of using the marketing management system 1200, a user 1218 may quickly ascertain the owners, channels, and other factors that stimulate opportunity creation and close while also proving marketing's impact on the revenue cycle. This builds credibility by showing how marketing programs drive conversion and accelerate leads through the revenue cycle. Through several user interfaces provided by the marketing analytics presentation module 1216, the user 1218 may analyze and compare opportunities represented by opportunity objects 1210 for a particular account represented by an account object 1208 in the marketing management system 1200.

Figure 13:
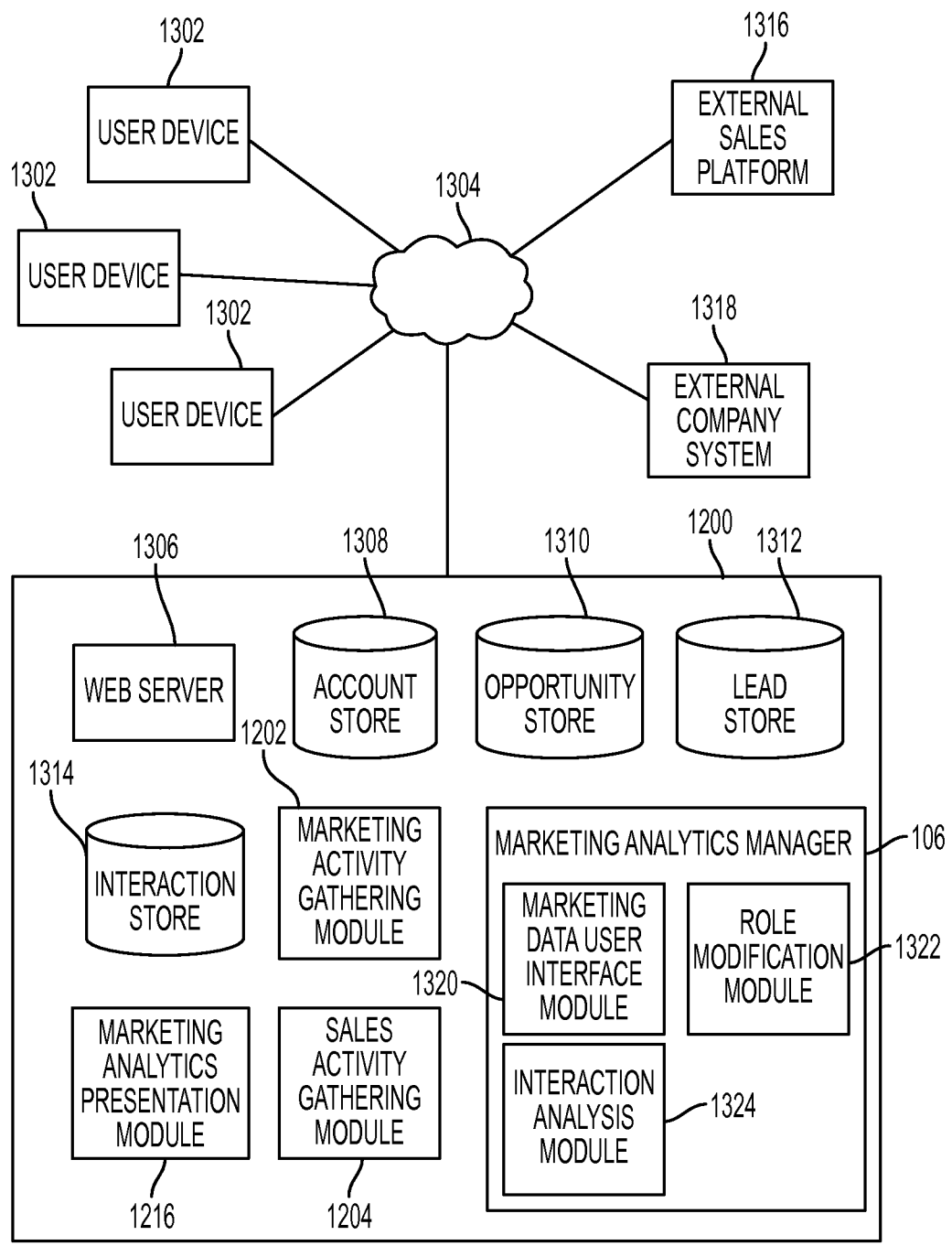
FIG. 13 is a high level block diagram illustrating a system environment suitable for selectively providing content to users of a social networking system, in accordance with an embodiment of the invention.

FIG. 13 is a high level block diagram illustrating a system environment suitable for selectively providing content to users of a social networking system, in accordance with an embodiment of the invention. The system environment comprises one or more user devices 1302, the marketing management system 1200, a network 1304, an external sales platform 1316, and external company system 1318. In alternative configurations, different and/or additional modules can be included in the system.

The user devices 1302 comprise one or more computing devices that can receive user input and can transmit and receive data via the network 1304. In one embodiment, the user device 1302 is a conventional computer system executing, for example, a Microsoft Windows-compatible operating system (OS), Apple OS X, and/or a Linux distribution. In another embodiment, the user device 1302 can be a device having computer functionality, such as a personal digital assistant (PDA), mobile telephone, smart-phone, etc. The user device 1302 is configured to communicate via network 1304. The user device 1302 can execute an application, for example, a browser application that allows a user of the user device 1302 to interact with the marketing management system 1200. In another embodiment, the user device 1302 interacts with the marketing management system 1200 through an application programming interface (API) that runs on the native operating system of the user device 1302, such as iOS and ANDROID.

In one embodiment, the network 1304 uses standard communications technologies and/or protocols. Thus, the network 1304 can include links using technologies such as Ethernet, 802.11, worldwide interoperability for microwave access (WiMAX), 3G, 4G, CDMA, digital subscriber line (DSL), etc. Similarly, the networking protocols used on the network 1304 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 1304 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

FIG. 13 contains a block diagram of the marketing management system 1200. The marketing management system 1200 includes a web server 1306, an account store 1308, an opportunity store 1310, a lead store 1312, an interaction store 1314, a marketing activity gathering module 1202, a sales activity gathering module 1204, a marketing analytics presentation module 1216, and a marketing analytics manager 1206 which comprises a marketing data user interface module 1320, a role modification module 1322, and an interaction analysis module 1324. In other embodiments, the marketing management system 1200 may include additional, fewer, or different modules for various applications. Conventional components such as network interfaces, security functions, load balancers, failover servers, management and network operations consoles, and the like are not shown so as to not obscure the details of the system.

The web server 1306 links the marketing management system 1200 via the network 1304 to one or more user devices 1302; the web server 1306 serves web pages, as well as other web-related content, such as Java, Flash, XML, and so forth. The web server 1306 may provide the functionality of receiving and routing messages between the marketing management system 1200 and the user devices 1302, for example, instant messages, queued messages (e.g., email), text and SMS (short message service) messages, or messages sent using any other suitable messaging technique. The user can send a request to the web server 1306 to upload information, for example, images or videos that are stored in the content store 1312. Additionally, the web server 1306 may provide API functionality to send data directly to native user device operating systems, such as iOS, ANDROID, webOS, and RIM.

A marketing activity gathering module 1202 collects information about interactions with leads performed by marketing staff or other users of the marketing management system 1200. Such information may include call records to leads, emails directed to leads, indications that emails were opened by leads, indications that emails were viewed but not opened, indications that leads were converted from prospects, indications that leads signed up for webinars, indications that leads downloaded documentation about products, indications that leads were converted into newly created opportunities, opening opportunities, closing opportunities, indications of "interesting moments" such as a lead downloading a whitepaper from the vendor's website, a lead opening an email from a sales representative, a lead attending a webinar, webpage visits, form fill-outs, tradeshows, email interactions, marketing program/campaign successes and so on. This information may be gathered from an external sales platform 1316, such as salesforce.com, as well as an external company system 1318, such as a customer relationship management (CRM) system offered by Microsoft, Netsuite, or SugarCRM. In one embodiment, the information may be manually inputted into the marketing management system 1200 through a user interface. In another embodiment, the information about marketing activity may be gathered by the marketing management system 1200 through application programming interface (API) calls to an external company system 1318. In a further embodiment, a SOAP (Simple Object Access Protocol) or REST (REpresentation State Transfer) API may be used by the marketing management system 1200 to receive an indication that an opportunity has been created.

Similarly, a sales activity gathering module 1204 gathers interaction information with leads with sales representatives that has been inputted into an external sales platform 1316, recorded in a database on an external company system 1318, or manually inputted into the marketing management system 1200 through a user interface or through API calls. Sales activity may include indications that leads have been converted into sales opportunities, activity logged by sales representatives regarding closing the opportunities, web activity performed by leads in relation to the opportunities logged by the external company system 1318, and information about the outcomes of the opportunities. "Interesting moments" may be manually entered or automatically generated by the marketing management system 1200 and included as interactions performed by leads in relation to the opportunity. For example, a lead that visited the website of the product being sold multiple times in a week may trigger an "interesting moment" to be generated by the marketing management system 1200. This provides more useful information to the sales representative trying to close the opportunity. Furthermore, the "interesting moment" highlights relevant information that might be otherwise obscured by other information. Such "interesting moments" that may be automatically generated may include a sales email being sent to a lead, a sales email being opened, sales phone calls made, and so on.

These interactions gathered by the marketing activity gathering module 1202 and by the sales activity gathering module 1204 may be saved as interaction objects 1212 stored in the interaction store 1314. The interaction objects 1212 are also associated with lead objects 1214 corresponding to the leads interacted with by marketing staff. These lead objects 1214 are stored by the marketing management system 1200 in the lead store 1312.

A marketing analytics manager 1206 receives the information about interactions with leads, including marketing activity gathered by the marketing activity gathering module 1202 and sales activity gathered by the sales activity gathering module 1204, regarding opportunities for accounts in a marketing management system 1200. For example, when a sales representative receives a lead from marketing staff that has been nurtured and developed into a sales opportunity, the sales opportunity is inputted into the marketing management system 1200 through a user interface, in one embodiment. In another embodiment, the sales opportunity may be inputted into the marketing management system 1200 through an API call from an external company system 1318 or through an external sales platform 1316 upon identifying the sales opportunity. The marketing analytics manager 1206, receiving the information that a lead associated with an account has been nurtured into a sales opportunity, generates an opportunity object 1210 associated with an account object 1208 in the marketing management system 1200 associated with a lead object 1214 and an interaction object 1212 for the information about the sales opportunity received. Opportunity objects 1210 are stored in the opportunity store 1310, and account objects 1208 are stored in the account store 1308 in the marketing management system 1200.

The marketing analytics manager 1206 includes a marketing data user interface module 1320, a role modification module 1322, and an interaction analysis module 1324. The marketing data user interface module 1320 provides a user interface to users of the marketing management module 1200 for manually inputting interaction information with leads by marketing staff or sales representatives. The role modification module 1322 receives a selection from a user 1218 of the marketing management module 1200 that indicates a lead associated with a lead object 1214 has a role in a sales opportunity represented by an opportunity object 1210. The role modification module 1322 stores an indication in the lead object 1214 associated with the opportunity object 1210 that the lead has a role in the sales opportunity. Leads associated with an opportunity may or may not have a role in the sales opportunity. For example, a lead may be a business associate that has done preliminary research about a product being marketed by marketing staff. That business associate may pass along information to a decision maker that may influence the creation and ultimate close of a sales opportunity. The role modification module 1322 enables users of a marketing management system 1200 to select leads associated with an account to have a role in the creation and/or close of an opportunity.

An interaction analysis module 1324 analyzes interactions with leads associated with an opportunity to determine the "interaction score". In one embodiment, an interaction score may be computed as the number of interactions associated with leads that are associated with the opportunity. In another embodiment, the interaction analysis module 1324 determines an interaction score as a weighted average of all the interactions. For example, an indication of a lead opened an email from marketing staff may be weighted, on a scale of 0-100, with a value of 50, as determined by marketing staff. In another embodiment, a regression model may be used to determine the weights based on past interactions and resulting outcomes of sales opportunities. In yet another embodiment, machine learning methods may be used to train a model for determining weights for the different types of interactions. In a further embodiment, the interaction analysis module 1324 determines an interaction score using an advanced lead scoring algorithm such that a higher lead score corresponds to a higher interaction score. An advanced lead scoring algorithm provides an instant score of the likelihood that a lead may be interested in a product. An advanced lead scoring algorithm may include a decay factor based on time. Once the advanced lead score reaches a predefined threshold, a marketing person may interpret the lead as having a higher likelihood to become an opportunity, or a sales representative may interpret the advanced lead score as having a higher likelihood of closing the opportunity with the lead successfully.

A marketing analytics presentation module 1216 provides information about interactions with leads with respect to an opportunity associated with an account to users of the marketing management system 1200. In one embodiment, the marketing analytics presentation module 1216 provides a graphical user interface including a graph having an x-axis and a y-axis in which the interactions with leads associated with an opportunity are provided over a timeline as plotted points. Each of the plotted points may appear larger or smaller based on the number of interactions that have occurred during that day or week, depending on how the timeline is provided by the marketing analytics presentation module 1216. For example, if there were 3 interactions that occurred with leads associated with an opportunity in the same week, such as an indication that a lead opened an email sent by marketing staff, an indication that the lead also searched for the name of the product being marketed, and an indication that the lead signed up for a webinar about the product, a plotted point would appear larger than a plot point for one interaction happening the next week that includes an indication that a whitepaper was downloaded by the lead about the product. In one embodiment, the number of interactions is cumulative, meaning that a line between the two points in the prior example would have an ascending slope by 1 interaction. The marketing analytics presentation module 1216 may also present a separate leads user interface that provides selectable links for the leads associated with the account, including indications that certain leads have been associated with the opportunity being displayed to the user of the marketing management system 1200. In the leads user interface, a viewing user of the marketing management system 1200 may select and deselect leads to add their historical interactions to the plotted graph, dynamically rendering the plotted points on the graph as leads are selected and deselected.

Embodiments described in the present disclosure may be practiced with various computer system configurations including hand-held devices, microprocessor systems, microprocessor-based or programmable consumer electronics, minicomputers, mainframe computers and the like. Several embodiments described in the present disclosure can also be practiced in distributed computing environments where tasks are performed by remote processing devices that are linked through a wire-based or wireless network.

Figure 14:
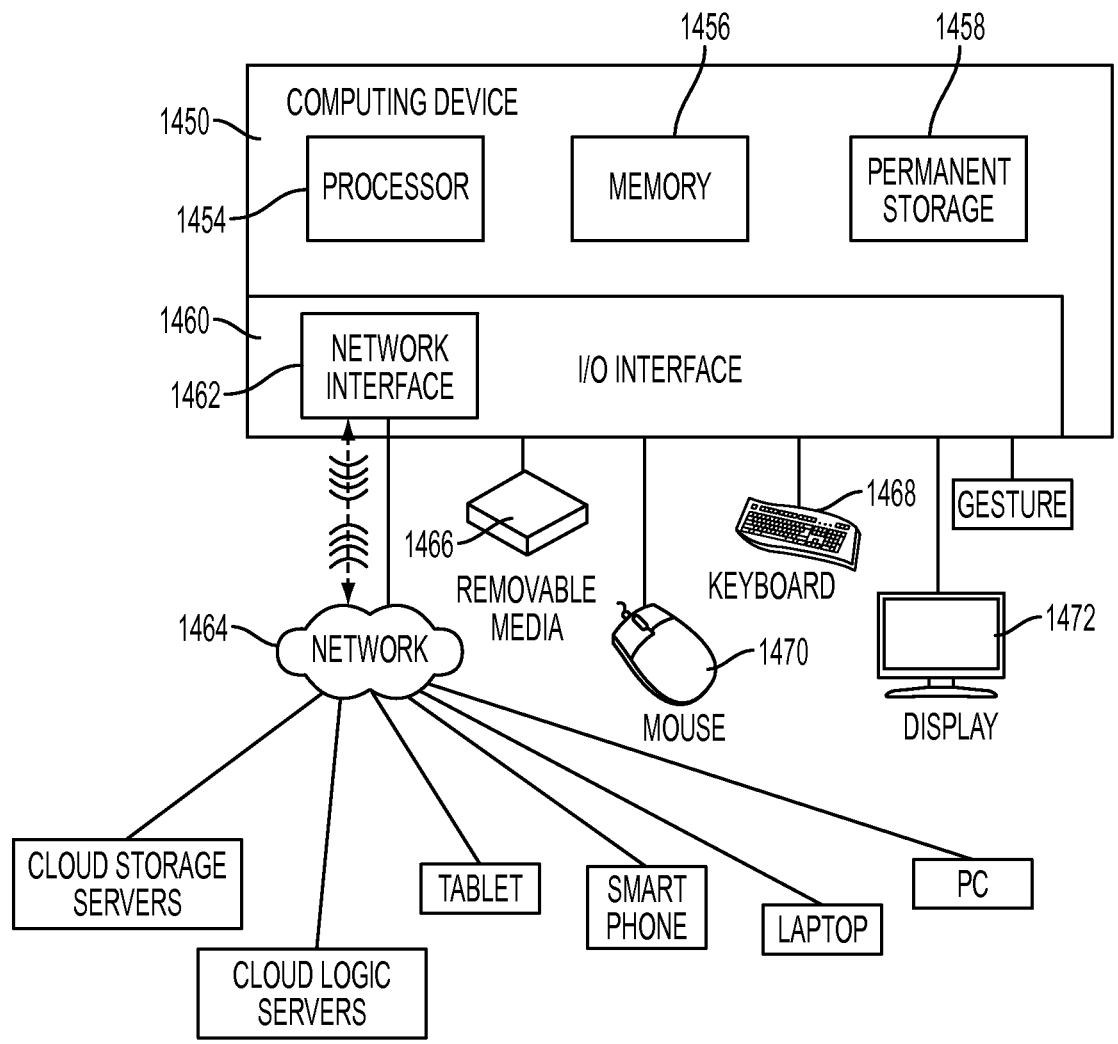
FIG. 14 is a simplified schematic diagram of a computer system for implementing embodiments of the present disclosure.

FIG. 14 is a simplified schematic diagram of a computer system for implementing embodiments of the present disclosure. It should be appreciated that the methods described herein may be performed with a digital processing system, which in one embodiment may be a conventional, general-purpose computer system. Special purpose computers, which are designed or programmed to perform a specific function, may be used in the alternative. The computing device 1450 includes a processor 1454, which is coupled through a bus to memory 1456, permanent storage 1458, and Input/Output (I/O) interface 1460.

Permanent storage 1458 represents a persistent data storage device, e.g., a hard drive or a USB drive, which may be local or remote. Network interface 1462 provides connections via network 1464, allowing communications (wired or wireless) with other devices. It should be appreciated that processor 1454 may be embodied in a general-purpose processor, a special purpose processor, or a specially programmed logic device. Input/Output (I/O) interface 1460 provides communication with different peripherals and is connected with processor 1454, memory 1456, and permanent storage 1458, through the bus. Sample peripherals include display 1472, keyboard 1468, mouse 1470, removable media device 1466, etc.

Display 1472 is configured to display the user interfaces described herein. Keyboard 1468, mouse 1470, removable media device 1466, and other peripherals are coupled to I/O interface 1460 in order to exchange information with processor 1454. It should be appreciated that data to and from external devices may be communicated through I/O interface 1460. Embodiments of the disclosure can also be practiced in distributed computing environments where tasks are performed by remote processing devices that are linked through a wired or a wireless network.

Embodiments of the present disclosure can be fabricated as computer readable code on a non-transitory computer readable storage medium. The non-transitory computer readable storage medium holds data which can be read by a computer system. Examples of the non-transitory computer readable storage medium include permanent storage 1458, network attached storage (NAS), read-only memory or random-access memory in memory module 1456, Compact Discs (CD), Blu-ray™ discs, flash drives, hard drives, magnetic tapes, and other data storage devices. The non-transitory computer readable storage medium may be distributed over a network-coupled computer system so that the computer readable code is stored and executed in a distributed fashion.

Some, or all operations of the method presented herein are executed through a processor. Additionally, although method operations have been described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Embodiments presented herein recite a device or apparatus. The apparatus may be specially constructed for the required purpose or may be a general purpose computer. The apparatus includes a processor capable of executing the program instructions of the computer programs presented herein.

Further shown are a plurality of other devices, storage, and services that may be connected to network 1464. Network 1464 can be, for example, the Internet. The Internet is interconnected with a plurality of devices, including cloud storage servers, cloud logic servers, user interface devices, etc. Some devices that can communicate with the Internet access services on various cloud logic servers and cloud storage can include, e.g., tablet computers, smart phones, laptops, desktop computers, television systems, and the like. The devices that can communicate with each other require at least a processor, and a display for presenting user interface views from selected programs and code that render the user interfaces. The user interface can be provided through keyboard entry, text entry, voice entry, gesture entry, and combinations thereof.

The user interfaces can be presented in browsers of the various devices, can interpret HTML code, can render video, can communicate over the Internet by way of wireless communication, can render Flash video data, and the like. All of these devices, hardware embodiments, and code are configured for enabling interfacing and interaction with various websites connected to the Internet, including social network websites and their associated users. Interaction through social networks will enable electronic messaging regarding current information, shared interests, chat communication, video communication, and general posting, interests, and relationship management. Broadly speaking, a social network is a site that allows at least two people or entities to communicate with one another and share at least one piece of data.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the various embodiments described in the present disclosure are not to be limited to the details given herein, but may be modified within the scope and equivalents of the appended claims.

What is claimed is:

1. A method, comprising:
   receiving a first user identifier assigned to a first browser and a first dataset corresponding to the first user identifier indicating a first set of user activities across a first website;
   receiving a second user identifier assigned to a second browser and a second dataset corresponding to the second user identifier indicating a second set of user activities across a second web site;
   identifying a first user-identifying activity associated with the first browser and a second user-identifying activity associated with the second browser, wherein the first user-identifying activity and the second user-identifying activity both indicate an identity of a single user corresponding to the first user identifier and the second user identifier;

based in part on the first user-identifying activity and the second user-identifying activity both indicating the identity of the single user, generating an account profile for the single user by:

analyzing data corresponding to the first set of user activities across the first website and the second set of user activities across the second website to identify, and including within the account profile, a first set of personal information associated with the single user provided via the first website and a second set of personal information associated with the single user provided via the second website;

generating an interaction score for the single user within the account profile by utilizing a machine-learning model to determine weights for different types of interactions, weighting interactions within the first website by the single user from the first set of user activities across the first website and interactions within the second website by the single user from the second set of user activities across the second website utilizing the determined weights, and utilizing a lead scoring algorithm comprising a decay factor accounting for time to determine a lead score for the single user such that a higher lead score corresponds to a higher interaction score;

determining an amount of visits by the single user to the first website and to the second website; and providing an indication within the account profile of the amount of visits by the single user to the first website and to the second website.

2. The method of claim 1, further comprising generating, for display within a graphical user interface of a computing device, a graphical representation of the first set of user activities and the second set of user activities over a time period.

3. The method of claim 1, wherein:

identifying the first user-identifying activity associated with the first browser comprises identifying a first disclosure of an email address for the single user on the first website via the first browser; and identifying the second user-identifying activity associated with the second browser comprises identifying an online transaction on the second website and a second disclosure of the email address for the single user via the second browser.

4. The method of claim 3, wherein identifying the first disclosure of the email address for the single user on the first website via the first browser comprises identifying an email message opened on an email website via the first browser.

5. The method of claim 1, wherein the first set of personal information of the second set of personal information comprises a name of the single user, an address of the single user, and a telephone number of the single user.

6. The method of claim 1, wherein: the first set of user activities across the first website corresponds to a first client device executing the first browser; and the second set of user activities across the second website corresponds to a second client device executing the second browser.

7. The method of claim 1, wherein: the first website corresponds to a first domain; and the second website corresponds to a second domain.

8. The method of claim 1, further comprising: receiving a request for a user identifier from a client device accessing an identity service web page via the first browser; and generating the first user identifier in response to the request for the user identifier.

9. The method of claim 1, further comprising generating the account profile for the single user by: determining different types of interactions on the first website and different types of interactions on the second website; and providing an indication within the account profile of the different types of interactions on the first website and the different types of interactions on the second website.

10. A non-transitory computer readable medium storing instructions thereon that, when executed by at least one processor, cause a computing device to:

receive a first user identifier assigned to a first browser and a first dataset corresponding to the first user identifier indicating a first set of user activities across a first website;

receive a second user identifier assigned to a second browser and a second dataset corresponding to the second user identifier indicating a second set of user activities across a second web site;

identify a first user-identifying activity associated with the first browser and a second user-identifying activity associated with the second browser, wherein the first user-identifying activity and the second user-identifying activity both indicate an identity of a single user corresponding to the first user identifier and the second user identifier;

based in part on the first user-identifying activity and the second user-identifying activity both indicating the identity of the single user, generate an account profile for the single user by:

analyzing data corresponding to the first set of user activities across the first website and the second set of user activities across the second website to identify, and including within the account profile, a first set of personal information associated with the single user provided via the first website and a second set of personal information associated with the single user provided via the second website;

generating an interaction score for the single user with in the account profile by utilizing a machine-learning model to determine weights for different types of interactions, weighting interactions within the first website by the single user from the first set of user activities across the first website and interactions within the second website by the single user from the second set of user activities across the second website utilizing the determined weights, and utilizing a lead scoring algorithm comprising a decay factor accounting for time to determine a lead score for the single user such that a higher lead score corresponds to a higher interaction score;

determining an amount of visits by the single user to the first website and to the second website; and providing an indication within the account profile of the amount of visits by the single user to the first website and to the second website.

11. The non-transitory computer readable medium of claim 10, further comprising instructions that, when executed by the at least one processor, cause the computing device to generate, for display within a graphical user interface, a graphical representation of the first set of user activities and the second set of user activities over a time period.

12. The non-transitory computer readable medium of claim 10, further comprising instructions that, when executed by the at least one processor, cause the computing device to:
identify the first user-identifying activity associated with the first browser by identifying a first disclosure of an email address for the single user on the first website via the first browser; and
identify the second user-identifying activity associated with the second browser by identifying an online transaction on the second website and a second disclosure of the email address for the single user via the second browser.

13. The non-transitory computer readable medium of claim 12, further comprising instructions that, when executed by the at least one processor, cause the computing device to identify the disclosure of the email address for the single user on the first website via the first browser by identifying an email message opened on an email website via the first browser.

14. The non-transitory computer readable medium of claim 10, further comprising instructions that, when executed by the at least one processor, cause the computing device to:
determine different types of interactions on the first website and different types of interactions on the second website; and
provide an indication within the account profile of the different types of interactions on the first website and the different types of interactions on the second website.

15. A system comprising: at least one processor; at least one non-transitory computer readable medium comprising: a distribution dataset comprising a set of distribution contacts and corresponding contact characteristics, and instructions that, when executed by the at least one processor, cause the system to:
receive a first user identifier assigned to a first browser and a first dataset corresponding to the first user identifier indicating a first set of user activities across a first website;
receive a second user identifier assigned to a second browser and a second dataset corresponding to the second user identifier indicating a second set of user activities across a second web site;
identify a first user-identifying activity associated with the first browser and a second user-identifying activity associated with the second browser, wherein the first user-identifying activity and the second user-identifying activity both indicate an identity of a single user corresponding to the first user identifier and the second user identifier;
based in part on the first user-identifying activity and the second user-identifying activity both indicating the identity of the single user, generate an account profile for the single user by:
analyzing data corresponding to the first set of user activities across the first website and the second set of user activities across the second website to identify, and including within the account profile, a first set of personal information associated with the single user provided via the first website and a second set of personal information associated with the single user provided via the second website;
generating an interaction score for the single user within the account profile by utilizing a machine-learning model to determine weights for different types of interactions, weighting interactions within the first website by the single user from the first set of user activities across the first website and interactions within the second website by the single user from the second set of user activities across the second website utilizing the determined weights, and utilizing a lead scoring algorithm comprising a decay factor accounting for time to determine a lead score for the single user such that a higher lead score corresponds to a higher interaction score;
determining an amount of visits by the single user to the first website and to the second website; and
providing an indication within the account profile of the amount of visits by the single user to the first website and to the second website.

16. The system of claim 15, further comprising instructions that, when executed by the at least one processor, cause the system to generate, for display within a graphical user interface of a computing device, a graphical representation of the first set of user activities and the second set of user activities over a time period.

17. The system of claim 15, further comprising instructions that, when executed by the at least one processor, cause the system to:
determine different types of interactions on the first website and different types of interactions on the second website; and
provide an indication within the account profile of the different types of interactions on the first website and the different types of interactions on the second website.

18. The system of claim 15, further comprising instructions that, when executed by the at least one processor, cause the system to:
identify the first user-identifying activity associated with the first browser by identifying a first disclosure of an email address for the single user on the first website via the first browser; and
identify the second user-identifying activity associated with the second browser by identifying an online transaction on the second website and a second disclosure of the email address for the single user via the second browser.

19. The system of claim 15, wherein the first set of personal information of the second set of personal information comprises a name of the single user, an address of the single user, and a telephone number of the single user.

20. The system of claim 15, further comprising instructions that, when executed by the at least one processor, cause the system to: identify the first user-identifying activity associated with the first browser by identifying the first user-identifying activity as corresponding to a first client device executing the first browser; and identify the second user-identifying activity associated with the second browser by identifying the second user-identifying activity as corresponding to a second client device executing the second browser.

* * * * *